US012808688B2

(12) United States Patent
Long, II

(10) Patent No.: US 12,808,688 B2
(45) Date of Patent: Nov. 24, 2026

(54) MAP REFINEMENT FOR INSIDE-OUT LOCATION TRACKING AND MAPPING SYSTEM

(71) Applicant: Qwake Technologies, Inc., San Francisco, CA (US)

(72) Inventor: John Davis Long, II, New York, NY (US)

(73) Assignee: Qwake Technologies, Inc., San Francisco, CA (US)

( * ) Notice: Subject to any disclaimer, the term of this patent is extended or adjusted under 35 U.S.C. 154(b) by 78 days.

(21) Appl. No.: 18/933,024

(22) Filed: Oct. 31, 2024

(65) Prior Publication Data

US 2025/0052593 A1 Feb. 13, 2025

Related U.S. Application Data

(63) Continuation-in-part of application No. 17/685,590, filed on Mar. 3, 2022, now Pat. No. 12,174,024.
(Continued)

(51) Int. Cl.
*G01C 21/00* (2006.01)
*G06T 7/00* (2017.01)
(Continued)

(52) U.S. Cl.
CPC ........ *G01C 21/3859* (2020.08); *G06T 7/0002* (2013.01); *G06T 7/248* (2017.01);
(Continued)

(58) Field of Classification Search
CPC ............ G01C 21/3859; G01C 21/1656; G06T 7/0002; G06T 7/248; G06T 7/277;
(Continued)

(56) References Cited

U.S. PATENT DOCUMENTS

2018/0342100 A1* 11/2018 Mollis .................. G06T 3/4038
2019/0197982 A1* 6/2019 Chi ...................... H04N 13/239
(Continued)

OTHER PUBLICATIONS

Wu, W., Zhu, H. & Zhang, Q. Epipolar Rectification by Singular Value Decomposition of Essential Matrix. Multimed Tools Appl 77, 15747-15771 (2018). https://doi.org/10.1007/s11042-017-5149-0.*
(Continued)

*Primary Examiner* — Brian P Sweeney
(74) *Attorney, Agent, or Firm* — Marton Ribera Schumann & Chang LLP; Chien-Ju Alice Chuang

(57) ABSTRACT

Techniques for map refinement (e.g., tracking data refinement) by an inside-out location tracking system may include computing a transform from a reference point to an epipolar line using an Essential Matrix derived from a reference frame camera motion in a live frame, computing several appearance errors between a feature associated with the reference point and other projected and optimized features, using a perpendicular projection hypothesis and an optimized point generated on the epipolar line, and evaluating the appearance errors using a greedy, ordered optimization. If the appearance error is less than a predetermined quality threshold, the optimized point is retained in tracking data. Otherwise the tracking data may be reset at the reference point location for reinitialization. An updated map and associated map data reflecting updated optimized points may be provided, for example, to a client device, as well as returned to a visual inertial odometry system.

17 Claims, 16 Drawing Sheets

Related U.S. Application Data

(60) Provisional application No. 63/156,246, filed on Mar. 3, 2021.

(51) Int. Cl.
*G06T 7/246* (2017.01)
*G06T 7/277* (2017.01)

(52) U.S. Cl.
CPC .... *G06T 7/277* (2017.01); *G06T 2207/30004* (2013.01); *G06T 2207/30168* (2013.01)

(58) Field of Classification Search
CPC ........... G06T 2207/30004; G06T 2207/30168; G06T 2207/10016; G06T 7/246; G06T 7/579; G06T 2207/30244
See application file for complete search history.

(56) References Cited

U.S. PATENT DOCUMENTS

| | | | | |
|---|---|---|---|---|
| 2022/0282978 | A1 | 9/2022 | Long, II | |
| 2023/0052582 | A1 * | 2/2023 | Ma | G06T 7/337 |
| 2024/0217538 | A1 * | 7/2024 | Guizilini | B60W 60/001 |
| 2024/0335745 | A1 * | 10/2024 | Barroso-Laguna | A63F 13/52 |

OTHER PUBLICATIONS

European Search Report in European Application No. EP25207077, mailed Mar. 10, 2026, pp. 1-9.
Kang Lai et al., "Combining Convolutional Neural Network and Photometric Refinement for Accurate Homography Estimation" IEEE Access, Mar. 7, 2019, vol. 7, pp. 109460-109473.
Simon Gibson et al., "Accurate Camera Calibration for Off-line, Video-Based Augmented Reality," Proceedings/Intenational Symposium on Mixed and Augmented Rality, 2002, p. 37.

* cited by examiner

MAP REFINEMENT FOR INSIDE-OUT LOCATION TRACKING AND MAPPING SYSTEM

CROSS-REFERENCE TO RELATED APPLICATIONS

This application is a continuation-in-part to U.S. patent application Ser. No. 17/685,590 entitled "Estimating Camera Motion Through Visual Tracking In Low Contrast High Motion Single Camera Systems," filed Mar. 3, 2022, which claims the benefit of U.S. Provisional Application No. 63/156,246, filed on Mar. 3, 2021, all of which are hereby incorporated by reference in their entirety.

BACKGROUND OF INVENTION

In high stress and oftentimes hazardous environments—firefighting, accident scene, search and rescue, disaster relief, oil and gas, fighter pilots, mining, police or military operation, special operations, and the like—workers and other personnel often need to navigate as a team in an environment where it is very difficult, if not impossible, for team members to locate each other through visual or verbal means. Often team members are too dispersed, either due to hazards, obstacles, or size of operating location, to maintain visual or verbal contact. Even where radio contact is available, in many hazardous environments (e.g., fire, military engagement, disaster environments) it may not be possible for a team member to accurately describe their location, particularly relative to others to aid in navigating quickly and efficiently to a desired location.

Also, the operating locations might be remote where conventional location tracking technologies (e.g., GPS and cellular) are unreliable (i.e., intermittent or insufficient resolution). Other persons (e.g., jogger, hiker, adventurer) also trek into remote areas and often get lost in locations where conventional location tracking technology is unreliable. While conventional GPS and cellular triangulation methods work well enough within urban environments, they often perform poorly in remote locations or in a disaster situation.

Many conventional existing team location tracking and mapping solutions require outside-in location tracking infrastructure, relying on external location services, such as GPS. Outside-in location tracking systems require infrastructure (e.g., GPS satellites, warehouse cameras, emitters, etc.) that is often lacking in these environments. Sparse feature tracking requires high quality images. Known camera-based inside-out team location tracking systems assume high-quality visible light images (i.e., for extracting sparse features, which are used for matching across time in order to estimate camera motion and scene structure). Since the hazardous or disaster environments in which emergency responders and critical workers often need to operate typically do not have access to external location services and cannot accommodate the capture of high-quality visible light images in real time, these conventional solutions are of limited use to them.

Thus, there is a need for an improved inside-out location tracking and mapping system.

BRIEF SUMMARY

The present disclosure provides techniques for map refinement (e.g., tracking data refinement) by an inside-out location tracking and mapping system. A method for map refinement by an inside-out location tracking and mapping system may include: computing a transform from a reference point to an epipolar line using an Essential Matrix derived from a reference frame camera motion in a live frame; computing a first appearance error between a first feature associated with the reference point and a second feature; computing a second appearance error between the first feature and a third feature using a perpendicular projection hypothesis; estimating a direction and a step size along the epipolar line using linear systems theory, thereby generating an optimized point on the epipolar line; computing a third appearance error between the first feature and a fourth feature associated with the optimized point; evaluating the first, second, and third appearance errors using a greedy, ordered optimization; and if the appearance error is less than a predetermined quality threshold, retaining the optimized point in tracking data, otherwise resetting the tracking data at a location associated with the reference point for reinitialization.

In some examples, the perpendicular projection hypothesis is configured to reduce a geometric error to zero. In some examples, the method also includes taking a directional derivative along the epipolar line. In some examples, the method also includes solving a linear system. In some examples, the method also includes outputting an updated map and associated map data, one or both of the updated map and associated map data including any updated optimized points. In some examples, the updated map and associated map data reflects tracking data that has been optimized for both geometric consistency and appearance consistency. In some examples, the method also includes providing the updated map and associated map data to a client device. In some examples, the method also includes providing the updated map and associated map data to a sparse mapping backend. In some examples, the method also includes providing the updated map and associated map data to an autonomous navigation system. In some examples, the method also includes providing the updated map and associated map data to a medical imaging system. In some examples, the method also includes providing the updated map and associated map data to a robotics system.

A system for map refinement for inside-out location tracking, the system comprising: a memory comprising non-transitory computer-readable storage medium configured to store instructions and data, the data being stored in an associative data structure; and a processor communicatively coupled to the memory, the processor configured to execute instructions stored on the non-transitory computer-readable storage medium to: compute a transform from a reference point to an epipolar line using an Essential Matrix derived from a reference frame camera motion in a live frame; compute a first appearance error between a first feature associated with the reference point and a second feature; compute a second appearance error between the first feature and a third feature using a perpendicular projection hypothesis; estimate a direction and a step size along the epipolar line using linear systems theory, thereby generating an optimized point on the epipolar line; compute a third appearance error between the first feature and a fourth feature associated with the optimized point; evaluate the first, second, and third appearance errors using a greedy, ordered optimization; and if the appearance error is less than a predetermined quality threshold, retain the optimized point in tracking data, otherwise reset the tracking data at a location associated with the reference point for reinitialization.

In some examples, the associative data structure comprises a tracking grid configured to update information about camera and scene points. In some examples, the associative data structure comprises a tracking grid configured to eliminate and insert new cameras and scene points. In some examples, the associative data structure comprises a tracking grid configured to evaluate a quality of a tracked scene point. In some examples, the data is associated with the reference frame camera motion in the live frame. In some examples, the data comprises tracking data associated with the live frame. In some examples, the data is associated with predetermined thresholds.

BRIEF DESCRIPTION OF THE DRAWINGS

Various non-limiting and non-exhaustive aspects and features of the present disclosure are described herein below with references to the drawings wherein.

Figure 1:
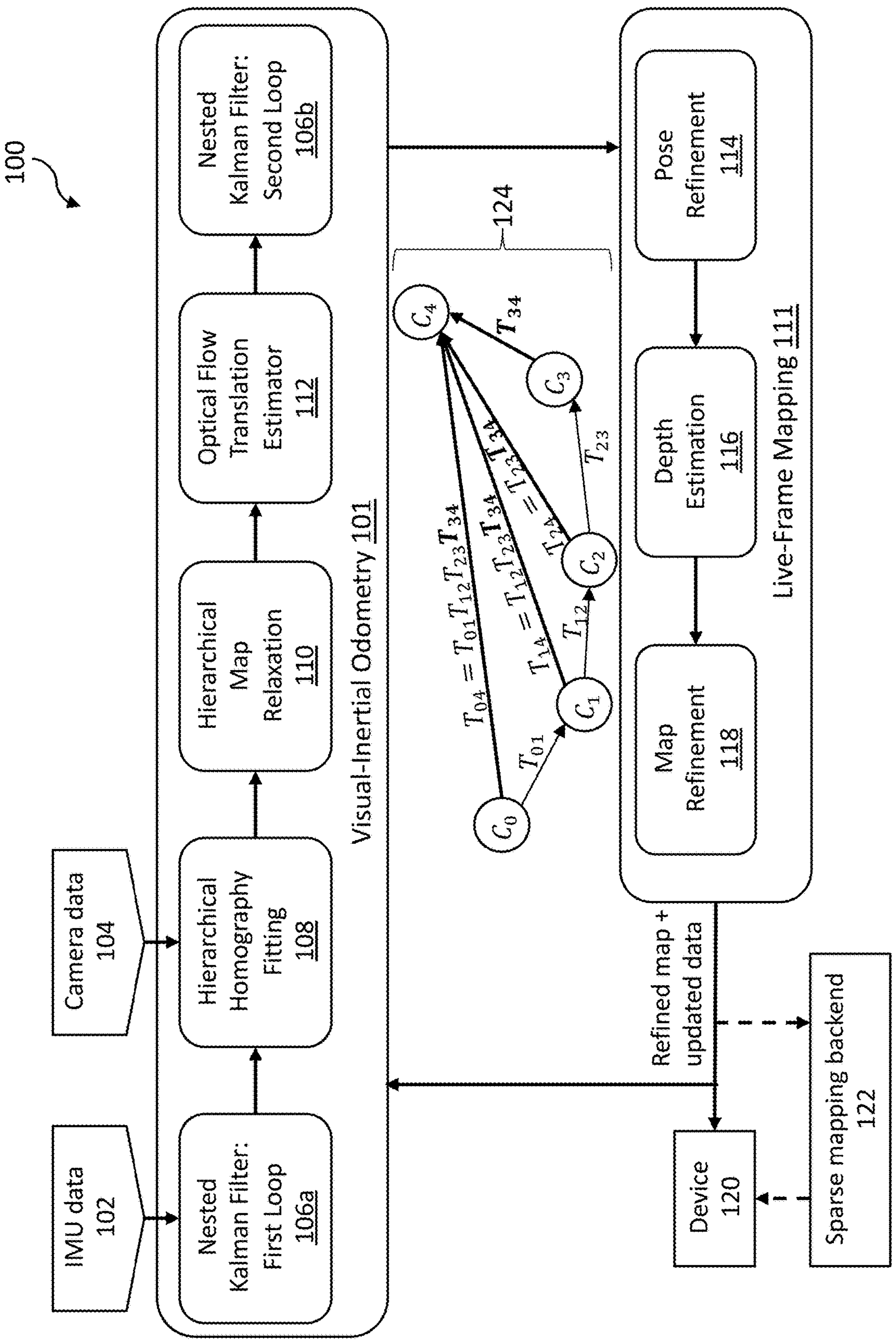
FIG. 1 is a simplified block diagram of an exemplary inside-out location tracking and mapping system framework, in accordance with one or more embodiments.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The invention is directed to a tracking and mapping system for tracking and mapping an environment comprising a team of emergency responders and critical workers, such as firefighters, EMTs, disaster relief personnel, incident commanders, other operation coordinators, law enforcement, military, and other public safety personnel. The invention comprises an inside-out location tracking system operative in low-visibility environments (e.g., dark, smoke-filled, or otherwise visibility impaired environments) with little-to-no access to external location services. The inside-out location tracking system is configured to perform dense feature tracking, tracking a whole image over time, using low-contrast and often blurry images (e.g., thermal camera images), without extracting features. The tracking system may also be configured to evaluate quality of the image data over time. The inside-out location tracking system may track each pixel in an image using a tracking grid comprising an associative data structure for (a) efficiently updating information about camera and scene points, (b) eliminating and inserting new cameras and scene points, and (c) evaluating the quality of tracked scene points. For example, based on a tracking grid's evaluation of quality, the tracking grid will either continue to track the image data currently associated with the grid vertex under evaluation or will allow itself to be re-allocated to a new location in the next image.

In some examples, the inside-out location tracking system framework may include a recursive nested Kalman filter, a hierarchical homography fitting module, a hierarchical map relaxation module, an optical flow translation estimator, a pose refinement module, a depth estimator, and a map refinement module. In some examples, the nested Kalman filter may be configured to perform sensor fusion, comprising two or more Kalman filters, each configured to receive state data from one or more sensors and one or more other Kalman filters and to output modified state estimates. A hierarchical homography fitting module (i.e., filter, estimator) may be configured to leverage information in a current camera image to initially model an environment as a plane and to extract camera motion from the associated homography. The hierarchical homography filter also may be configured to downsample an image into a hierarchical image pyramid to increase the convergence radius of a model fitting process. Examples of a hierarchical homography filter are described in U.S. patent application Ser. No. 17/685,590 entitled "Estimating Camera Motion Through Visual Tracking In Low Contrast High Motion Single Camera Systems," filed Mar. 3, 2022, which is incorporated by reference herein.

In some examples, a hierarchical homography filter also may be configured to account for differences in orientation between the z-axis of a camera and a scene plane normal when a camera is rotated relative to the plane normal of a planar structure in the scene that is close to the camera. This may occur, for example, when a camera is being worn or carried by a user on a body part (e.g., head) that may rotate or pivot with respect to the planar structure. In some examples, a Special Euclidean group parameterization model—SE(3)—may assume the scene plane normal to be parallel to the z-axis of the camera. In an example, a homography may be expressed as $$H = R + \frac{tn^T}{d},$$

and an SE(3) parameterization of this homography may assume that n=[0; 0; 1] and d=1. This bias may shrink quickly as a function of the distance between the camera and the scene plane. Thus, to correct this model bias, we can allow n to vary. Given $\|n\|_2=1$, only 2 additional parameters are required. Using the Lie Algebra of a special linear group of dimension 3—SL(3)—this problem may be solved analytically. Since SL(3) assumes det(H)=1, the area of the plane is fixed across camera motion estimates, which limits the ability to estimate changes in depth/scale (e.g., z-axis translation). However, this constraint may be relaxed using approximate SL(3) generators (e.g., SE(3) generator for a z-axis translation) and renormalization performed between optimization steps. Thereby, the assumptions of SL(3) may be met at the beginning of each iteration of a hierarchical homography fitting optimization process while also allowing for the elimination of steps off of the SL(3) manifold to account for changes in scale and depth.

The hierarchical map relaxation module may be configured to leverage image appearance differences between two consecutive images to refine an initial planar geometric model that matches the coordinates in one image to the next. The optical flow translation estimator may be configured to estimate a translation component of camera motion using an arbitrary optical flow map. The map refinement module may be configured to jointly optimize geometric and appearance consistency. This inside-out location tracking system may deliver a refined map of the environment, including location tracking information (e.g., refined camera motion data, optical flow translation data, depth estimation data, etc.) about individual users within the environment, to one or more devices (e.g., helmet mounted navigation and communication systems, other types of heads-up displays, tablets, smart phones, and other mobile devices) being carried or worn by users (e.g., emergency responders, critical workers, incident commanders, disaster relief coordinators, emergency response coordinators, etc.). In some examples, the refined map and location tracking information may be fed back into the inside-out location tracking framework (e.g., to a recursive nested Kalman filter and a hierarchical homography fitting module) for continued real-time tracking and monitoring of movement of a group of users in the environment. In other examples, the refined map and location tracking information may be used to create keyframes to be used for sparse mapping and other processing.

FIG. 1 is a simplified block diagram of an exemplary inside-out location tracking and mapping system framework, in accordance with one or more embodiments. Framework 100 may comprise a visual-inertial odometry system 101 comprising nested Kalman filter 106 (including a first loop 106*a* and a second loop 106*b*), hierarchical homography fitting module 108, hierarchical map relaxation module 110, and optical flow translation estimator 112. In some examples, the first loop 106*a* may comprise an "inner" loop of nested Kalman filter 106 configured to generate a first set of posterior state estimates (e.g., predicted and converted set of state data) that may be provided to the second loop 106*b*. In some examples, the second loop 106*b* may comprise an "outer" loop of nested Kalman filter 106 configured to receive a predicted and converted set of state estimates and to generate an updated state (e.g., posterior estimate or postdiction) that may be output to one or more downstream modules. In some examples, inertial measurement unit (IMU) data 102 from an IMU, and other state data, may be provided to nested Kalman filter 106 for generating non-linear prediction and postdiction state estimates. In some examples, hierarchical homography fitting module 108 may be configured to receive camera data 104 to initially model an environment as a plane, to extract camera motion from the associated homography, and to generate a hierarchical image pyramid. Examples of hierarchical map relaxation module 110 and optical flow translation estimator 112 are described in more detail herein.

Framework 100 also may comprise a live-frame mapping system 111 comprising pose refinement module 114, depth estimator 116, and map refinement module 118. Live-frame mapping system 111 may be configured to receive inter-frame camera motion transformation, including an updated translation vector estimation, and postdiction state estimates, to further refine a map of the environment and update pose and depth estimates associated with a (i.e., further) refined map. In some examples, the refined map and updated map estimates may be provided to device 120, which may be configured to use the refined map for downstream uses (e.g., provide tracking information, visualizations, messages, alerts, notifications, and other information to users). In some examples, the updated map estimates may be provided to sparse mapping backend 122 (e.g., converted to keyframes). In some examples, device 120 may comprise a client device configured to be carried or worn by a field user (e.g., engaged in an active rescue, disaster relief, firefighting, police operation, military operation, or other tactical operation) or a command user (e.g., coordinating a group of field users).

Figure 2A:
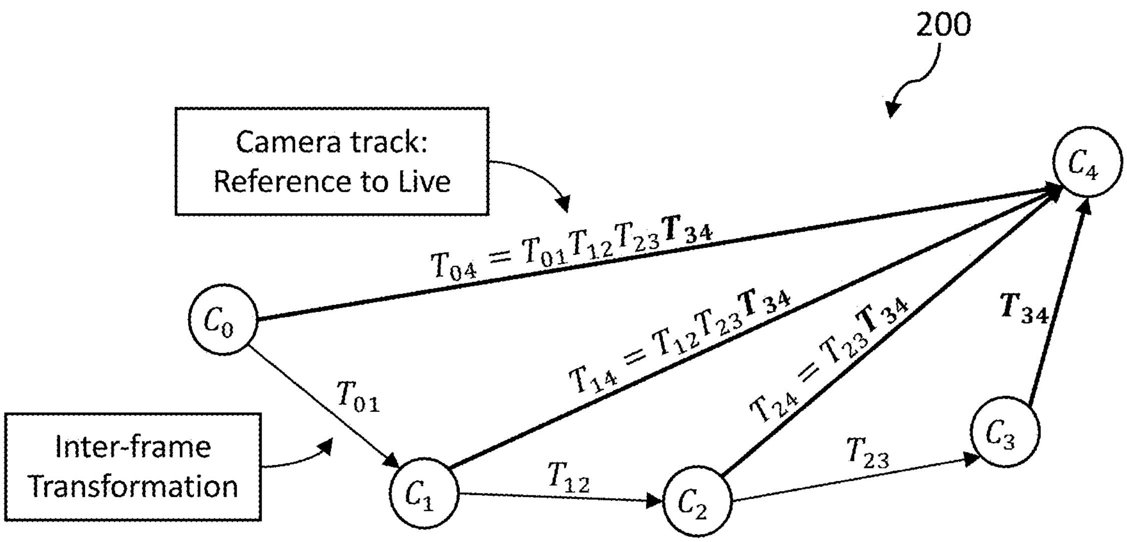
FIGS. 2A-2B are diagrams illustrating an exemplary associative data structure for an inside-out location tracking and mapping system, in accordance with one or more embodiments.
Figure 2B:
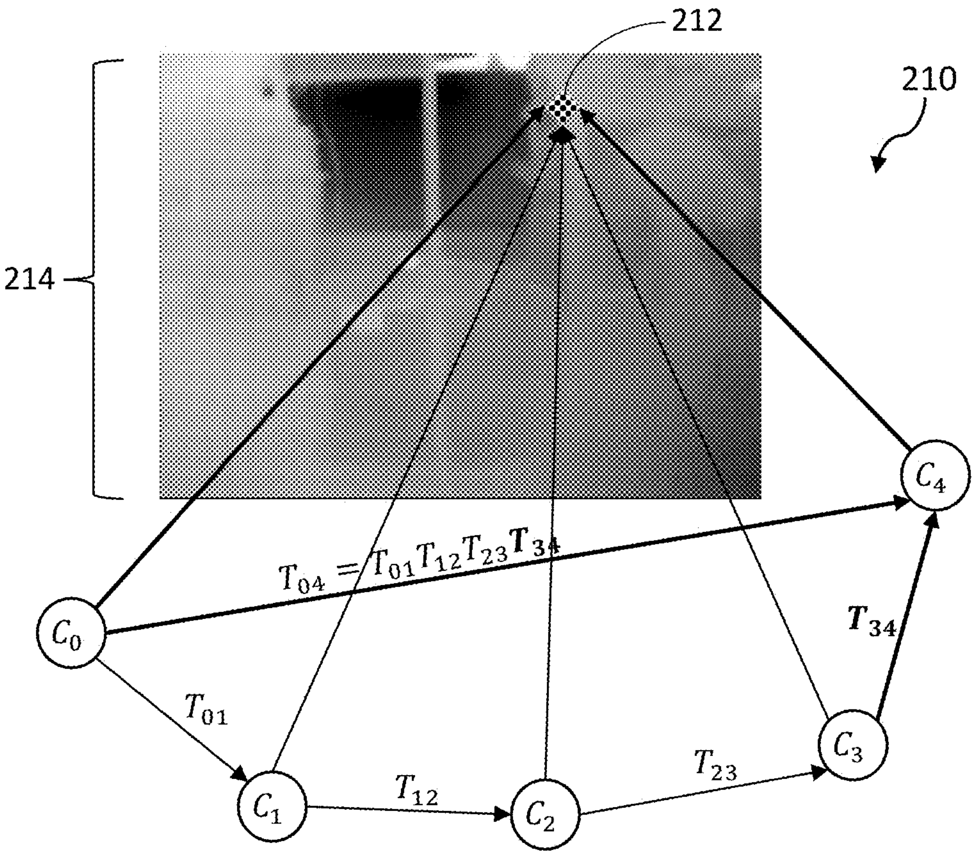

In some examples, IMU data 102 and camera data 104 may be stored in an associative data structure, such as tracking grid 124. Tracking grid 124 may be configured to efficiently update information about camera and scene points, eliminate and insert new cameras and scene points, and evaluate the quality of tracked scene points. FIGS. 2A-2B are diagrams illustrating an exemplary associative data structure for an inside-out location tracking and mapping system, in accordance with one or more embodiments. Associated data structures 200 and 210 may comprise tracking grids configured to track cameras $C_0$ through $C_4$ along with the inter-camera transformation estimates (e.g., $T_{04}$, $T_{14}$, $T_{24}$, and $T_{34}$) and inter-frame transformations (e.g., $T_{01}$, $T_{12}$, $T_{23}$, etc.) between them and any location 212 within the live image 214.

Nested Kalman Filter

Figure 3:
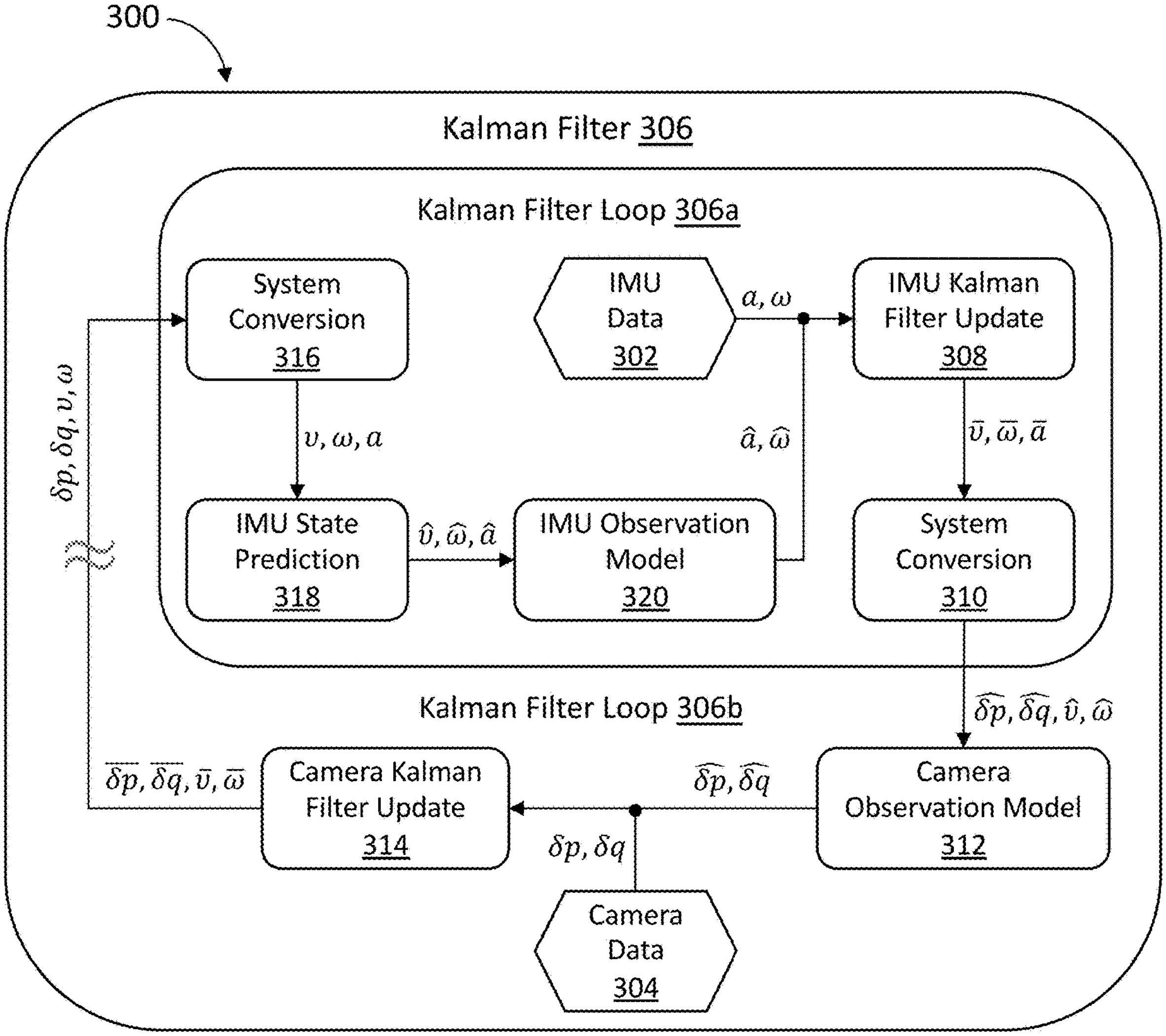
FIG. 3 is a diagram illustrating an exemplary recursive nested Kalman filter architectural flow, in accordance with one or more embodiments.

A recursive nested Kalman filter (e.g., nested Kalman filters 106*a*-106*b* in FIG. 1) may be comprise two Kalman filter loops (e.g., inner and outer loops, an IMU Kalman loop and camera Kalman loop, or other first and second loops) configured to estimate (e.g., predict) state data from sensor data (e.g., IMU data, camera data). In some examples, state data may comprise one, or a combination, of a position (p)/position change ($\delta_p$), a rotation (q)/rotation change ($\delta_q$), velocity (v), and angular velocity (ω). FIG. 3 is a diagram illustrating an exemplary recursive nested Kalman filter architectural flow, in accordance with one or more embodiments. Diagram 300 shows a recursive nested Kalman filter 306 comprising Kalman filter loop 306*a*-306*b*. In some examples, Kalman filter loop 306*a* may comprise an IMU Kalman filter update module 308, system conversion module 310, another system conversion module 316, IMU state prediction module 318, and IMU observation model 320. In some examples, Kalman filter loop 306*b* may comprise camera observation model 312 and camera Kalman filter update module 314. In some examples, IMU Kalman filter update module 308 may be configured to receive IMU data 302 and IMU observation state data (e.g., derived from predicted IMU state data from IMU state prediction module 318) from IMU observation model 320 to generate updated predicted state data, the updated predicted state data comprising an updated predicted velocity, an updated predicted angular velocity, and an updated predicted acceleration. In some examples, IMU observation model 320 may be configured to simplify state data to an acceleration and an angular velocity. System conversion module 310 may be configured to convert IMU-based state data (e.g., acceleration, angular velocity) to a camera-based state data (e.g., position change, rotation change, velocity, and angular velocity). In some examples, camera Kalman filter update module 314 may be configured to receive camera data 304 (e.g., pose data, rotation data, transformed camera-based state information) and camera observation state data from camera observation model 312 to generate updated estimated state data (e.g., updated posterior estimate, updated postdiction), the updated estimated state data comprising an updated estimated change in pose/position, an updated estimated change in rotation, an updated estimated velocity, and an updated estimated angular velocity. In some examples, camera observation model 312 may be configured to simplify state data to a predicted pose/position change and rotation change. In some examples, this posterior estimate may be provided to downstream modules. This posterior estimate also may be provided recursively back to Kalman filter loop 306*a* (e.g., to system conversion module 316) for further refinement.

In some examples, system conversion module 316 may be configured to convert camera-based state data to IMU-based state data. In some examples, IMU state prediction module 318 may be configured to generate a predicted state (e.g., a set of predicted IMU state data) using the returned posterior estimate, the predicted state comprising a predicted velocity, predicted angular velocity, and predicted acceleration. In other examples, one or both of system conversion modules 310 and 316 may reside outside of Kalman filter loop 306*a*.

In some examples, wherein states and observations are assumed to be Gaussian distributions, recursive nested Kalman filter 306 may be configured to fuse state predictions with noisy observations through multiplication. In some examples, transformation of state information may be performed prior to estimation. In some examples, recursive nested Kalman filter 306 also may be a Bayesian estimator by recursively updating between prediction and evidence:

$$P(X \mid Z) \propto P(Z \mid X)P(X)$$

wherein P(X|Z) represented a fused estimation (e.g., posterior estimate), P(Z|X) represents an observation, and P(X) represents a prediction. Operations for updating means and covariances associated with computations being made by the recursive nested Kalman filter may follow standard Gaussian equations. State prediction may be performed using the following equation:

$$\hat{x}_{t+1} = f(x_t, u_t) \triangleq x_t + \delta f(x_t, u_t)$$

In some examples, $f(x_t, u_t)$ may represent a prediction function. In some examples, $\hat{x}_{t+1}$ may comprise a predicted state determined using IMU data (e.g., sensor data), an IMU Kalman filter update module, and a system conversion module configured to convert an IMU-based state data (e.g., acceleration, angular velocity) to a camera-based state data (e.g., position change, rotation change, velocity, and angular velocity). State estimation may then be performed using the following equation:

$$x_{t+1} = \hat{x}_{t+1} + K(z_{t+1} - l(\hat{x}_{t+1}))$$

In some examples, $l(\hat{x}_{t+1})$ may represent an observation function. In some examples, $x_{t+1}$ may comprise an estimated state (e.g., posterior estimate, postdiction) determined using predicted state $\hat{x}_{t+1}$, an observation model, and a camera Kalman filter update module.

Figure 4:
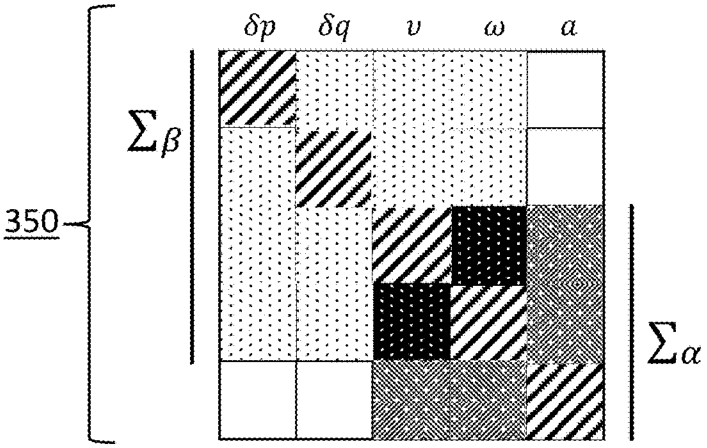
FIG. 4 is chart illustrating an exemplary covariance matrix for a recursive nested Kalman filter, in accordance with one or more embodiments.

FIG. 4 is chart illustrating an exemplary covariance matrix for a recursive nested Kalman filter, in accordance with one or more embodiments. Covariance matrix 350 may be used to represent the state data as it is processed (e.g., updated, converted, predicted, etc.) throughout a system and method for estimating state data using a recursive nested Kalman filter. Covariance matrix may break down into sub-matrices $\Sigma_\alpha$ (e.g., IMU-based state data) and $\Sigma_\beta$ (e.g., camera-based state data), which may be updated sequentially and recursively by a recursive nested Kalman filter (e.g., recursive nested Kalman filter 106*a-b* in FIG. 1, recursive Kalman filter 306 in FIG. 3). In some examples, sub-matrix $\Sigma_\alpha$ may comprise state data predicted and updated by Kalman filter loop 306*a*. In some examples, sub-matrix $\Sigma_\beta$ may comprise state data predicted and updated by Kalman filter loop 306*b*.

Figure 5:
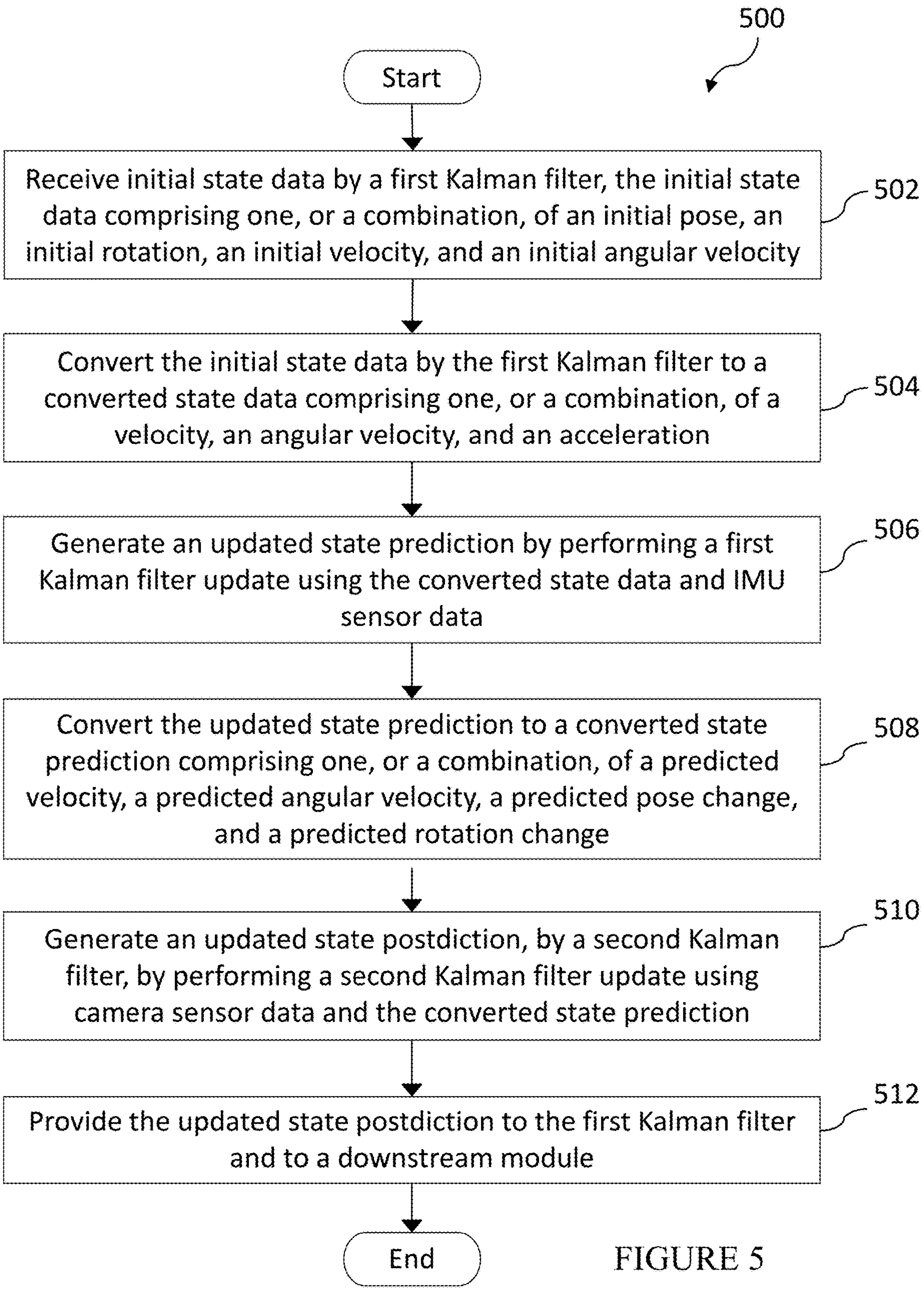
FIG. 5 is a process flow diagram illustrating an exemplary method for estimating state data using a recursive nested Kalman filter for an inside-out location tracking and mapping system, in accordance with one or more embodiments.

FIG. 5 is a process flow diagram illustrating an exemplary method for estimating state data using a recursive nested Kalman filter for an inside-out location tracking and mapping system, in accordance with one or more embodiments. Process 500 may begin with receiving initial state data by a first Kalman filter at step 502, the initial IMU data comprising one, or a combination, of an initial pose, an initial rotation, an initial velocity, and an initial angular velocity. The initial state data may be converted by the first Kalman filter to a converted state data in step 504, wherein the converted state data comprises one, or a combination, of a velocity, an angular velocity, and an acceleration. In some examples, this conversion may be performed by a camera-to-IMU system conversion module (e.g., system conversion module 316 in FIG. 3). An updated state prediction may be generated by performing a first Kalman filter update using the converted state data and IMU sensor data at step 506, for example, by an IMU Kalman filter update module. In some examples, the converted state data may undergo prediction and modeling steps, for example by an IMU state prediction module and IMU observation model, respectively, prior to being combined with IMU sensor data for generating the updated state prediction. The updated state prediction may be converted to a converted state prediction at step 508, the converted state prediction comprising one, or a combination, of a predicted velocity, a predicted angular velocity, a predicted pose change, and a predicted rotation change. An updated state postdiction (e.g., posterior estimate) may be generated by a second Kalman filter (e.g., comprising a camera Kalman filter update module), at step 510, by performing a second Kalman filter update using camera sensor data and the converted state prediction. In some examples, the updated state postdiction may be provided to one or both of the first Kalman filter and a downstream module at step 512. In some examples, the downstream module may comprise other components of a visual-inertial odometry system and/or a live-frame mapping system.

Hierarchical Map Relaxation

A hierarchical map relaxation module (e.g., hierarchical map relaxation module 110 in FIG. 1) may be configured to model non-rigid shear and parallax using a bijective mapping (e.g., the hierarchical image pyramid and homography output by the hierarchical homography filter), thereby minimizing errors in the estimation of camera motion and improved scene depth estimates. A hierarchical image pyramid may be constructed from an image (e.g., a source image, a target image), resulting in a multi-level image having an original image at the base level, with each level above the base being a smoothed and downsampled copy of the level below (e.g., the level immediately above the base being a smoothed and downsampled copy of the original image). Each image coordinate may be mapped between the source image and the target image by minimizing the error between a P×P (e.g., 2×2, 3×3, 4×4, etc.) patch, wherein map R:(x, y)→(x', y'), x and y designating the column and row within the 2D image coordinate map, respectively.

Figure 6:
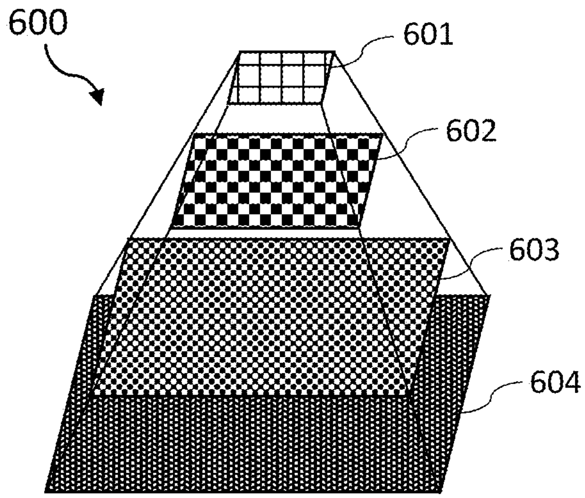
FIG. 6 is a diagram showing an exemplary hierarchical image pyramid for input to a hierarchical map relaxation module, in accordance with one or more embodiments.

FIG. 6 is a diagram showing an exemplary hierarchical image pyramid for input to a hierarchical map relaxation module, in accordance with one or more embodiments. A hierarchical image pyramid 600 may comprise base level 604 and levels 601-603 above base level 604. In some examples, base level 604 may comprise an original, full-resolution image, or copy thereof. In some examples, level 603 may be downsampled by a factor of X from base level 604. In some examples, level 601 comprises a top level. While hierarchical image pyramid 600 is shown as comprising 3 levels above base level 604, any N number of levels (e.g., fewer or more) may be used.

Figure 7:
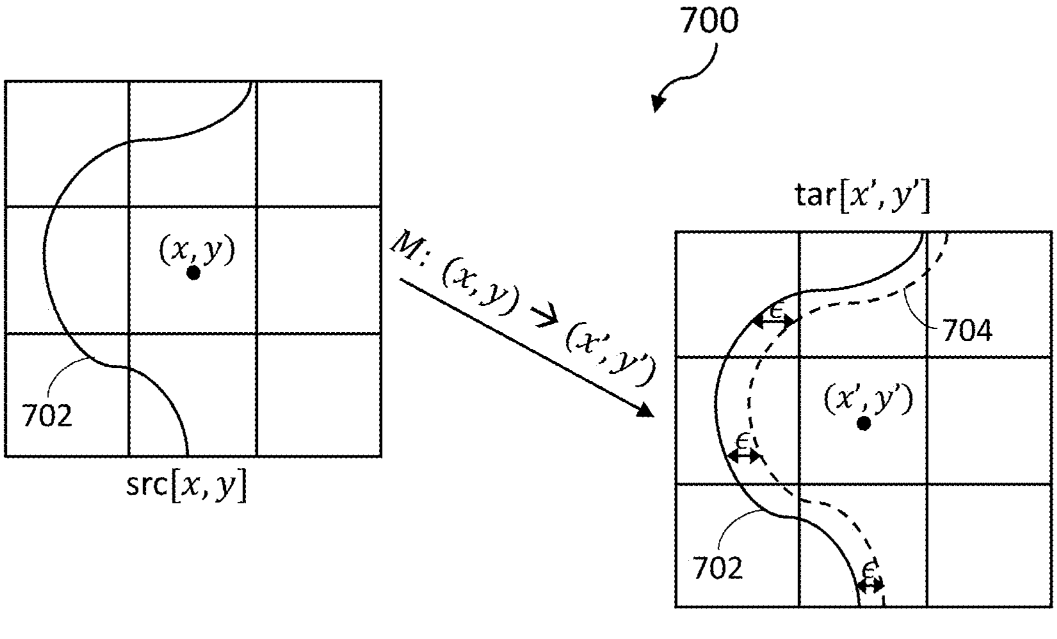
FIG. 7 is a diagram illustrating exemplary P×P patches associated with a coordinate in a source image and a target image in a hierarchical image pyramid, in accordance with one or more embodiments.

A method for hierarchical map relaxation may begin with initializing to a coordinate map provided by the homography, $R_0=H:(x, y)\rightarrow(x', y')$. FIG. 7 is a diagram illustrating exemplary P×P patches associated with a coordinate in a source image and a coordinate output by the map in a target image in a hierarchical image pyramid, in accordance with one or more embodiments. As shown in diagram 700, a P×P patch around an (x, y) coordinate of a source image and another P×P patch around a corresponding (x', y') coordinate of a target image, under a coordinate mapping $R_i:(x, y)\rightarrow(x', y')$, may be analyzed, generating a pair of image patches. In some examples, each P×P patch may indicate a patch of image intensities (e.g., represented by curves 702 and 704), and allow for a definition of an error vector $\epsilon$:

$$\epsilon = src[x+i, y+j] - \text{tar}[x'+i, y'+j],\ i\cdot j \in \{-1, 0, 1\} \in \mathfrak{R}^9$$

wherein $\mathfrak{R}$ indicates a number of real dimensions. A δx' and δy' that locally minimizes this error may be determined by taking a numerical derivative of $\epsilon$ with respect to x' and y' and solving the linear system, Ax=b, using a special case of Singular Value Decomposition (SVD):

$$J = \left[\frac{\partial\epsilon}{\partial x'}, \frac{\partial\epsilon}{\partial y'}\right];\ A = J^T J \in \mathfrak{R}^{2\times 2},\ b = J^T\epsilon \in \mathfrak{R}^{2\times 1},$$
$$\text{solve for } x = (A^T A)^{-1} A^T b \text{ via } SVD$$

The pair of increments, (δx', δy'), for each coordinate mapping may be used to update the mapping:

$$M^i = (x, y) \rightarrow (x', y') \text{ to } M^{i+1}: (x, y) \rightarrow (x'+\delta x', y'+\delta y')$$

Figure 8:
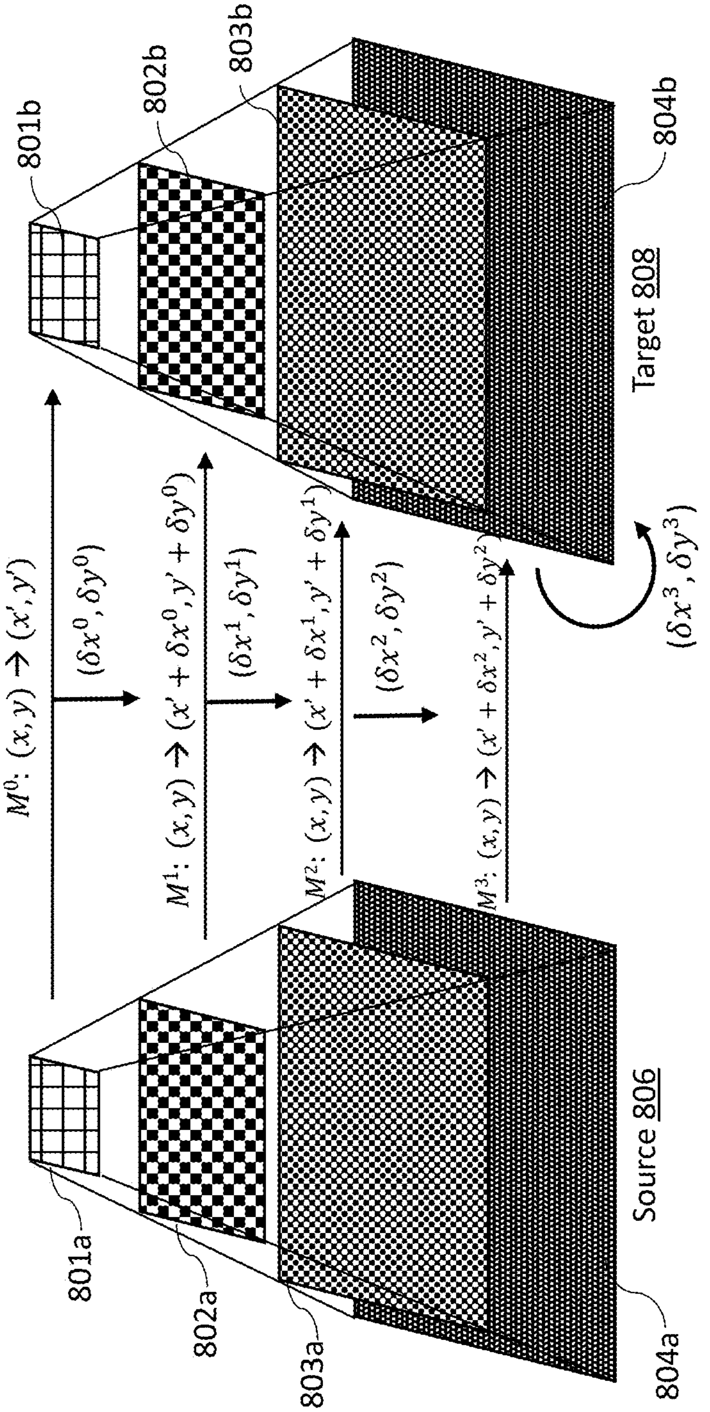
FIG. 8 is a diagram illustrating an exemplary hierarchical map relaxation logic proceeding between a first hierarchical image pyramid for a source image and a second hierarchical image pyramid for a target image, in accordance with one or more embodiments.

This map relaxation method results in a piecewise-linear approximation to any 2D intensity value function at the resolution of the 2D coordinate map domain. This method can approximate intensity value functions at multiple scales, from coarse to fine, as it operates from the top to the bottom of the image pyramid, level-by-level. FIG. 8 is a diagram illustrating an exemplary hierarchical map relaxation logic proceeding between a first hierarchical image pyramid for a source image and a second hierarchical image pyramid for a target image, in accordance with one or more embodiments. Source image pyramid 806 and target image pyramid 808 may have the same or similar structure and function as other hierarchical image pyramids described herein (e.g., hierarchical image pyramid 600). In some examples, source image pyramid 806 and target image pyramid 808 may comprise base levels 804*a*-804*b*, respectively. Source image pyramid 806 and target image pyramid 808 also may comprise other levels 801*a*-803*a* and 801*b*-803*b* above base levels 804*a* and 804*b*, respectively. The relationship between the levels of source image pyramid 806 and target image pyramid 808 may be described as follows:

- Top levels 801*a* and 801*b* may each comprise a downsampled copy of a source image and a target image, respectively, downsampled at each level by a factor of X (e.g., 2 or more) between levels;
- Map $M^i=(x, y)\rightarrow(x', y')$ is relaxed by estimating the $(\delta x', \delta y')$, wherein i is 0 at the top level 801*a* and 801*b* in our example in FIG. 8;
- $(\delta x', \delta y')$ are expanded to a corresponding region in the level below—e.g., $(\delta x^0, \delta y^0)$ is expanded to levels 802*a* and 802*b;*
- A greedy evaluation of $(\delta x', \delta y')$ is performed in the level below—e.g., a greedy evaluation of $(\delta x^0, \delta y^0)$ is performed at levels 802*a* and 802*b*
  - if error $M^i=(x, y)\rightarrow(x'+\delta x', y'+\delta y')<M^i=(x, y)\rightarrow(x', y')$ then keep $(\delta x', \delta y')$, otherwise discard;
- A new $(\delta x', \delta y')$ is estimated at this current level—e.g., $(\delta x^1, \delta y^1)$ at levels 802*a* and 802*b*—and the new $(\delta x', \delta y')$ is expand into a next level below—e.g., levels 803*a* and 803*b;*
- If there are more levels, iteratively estimate and expand until a base level is reached;
- At the base level, a greedy evaluation may be performed using $(\delta x', \delta y')$ from the level above—e.g., a greedy evaluation is performed at levels 804*a* and 804*b* using $(\delta x^2, \delta y^2)$ from levels 803*a* and 803*b;* and
- A last $(\delta x', \delta y')$ may be estimated and another greedy evaluation may be performed (again) within the base level of the target image pyramid—e.g., a final $(\delta x^3, \delta y^3)$ may be estimated and another greedy evaluation performed within level 804*b*.

The output of this map relaxation method comprises both a tight image appearance match between the source image and the target image, as well as an accurate map from the source image to the target image 2D coordinates, which provides important information for blind scene structure estimation. This results in a high-quality optical flow map (i.e., field) between adjacent frames that captures scene motion.

Figure 9:
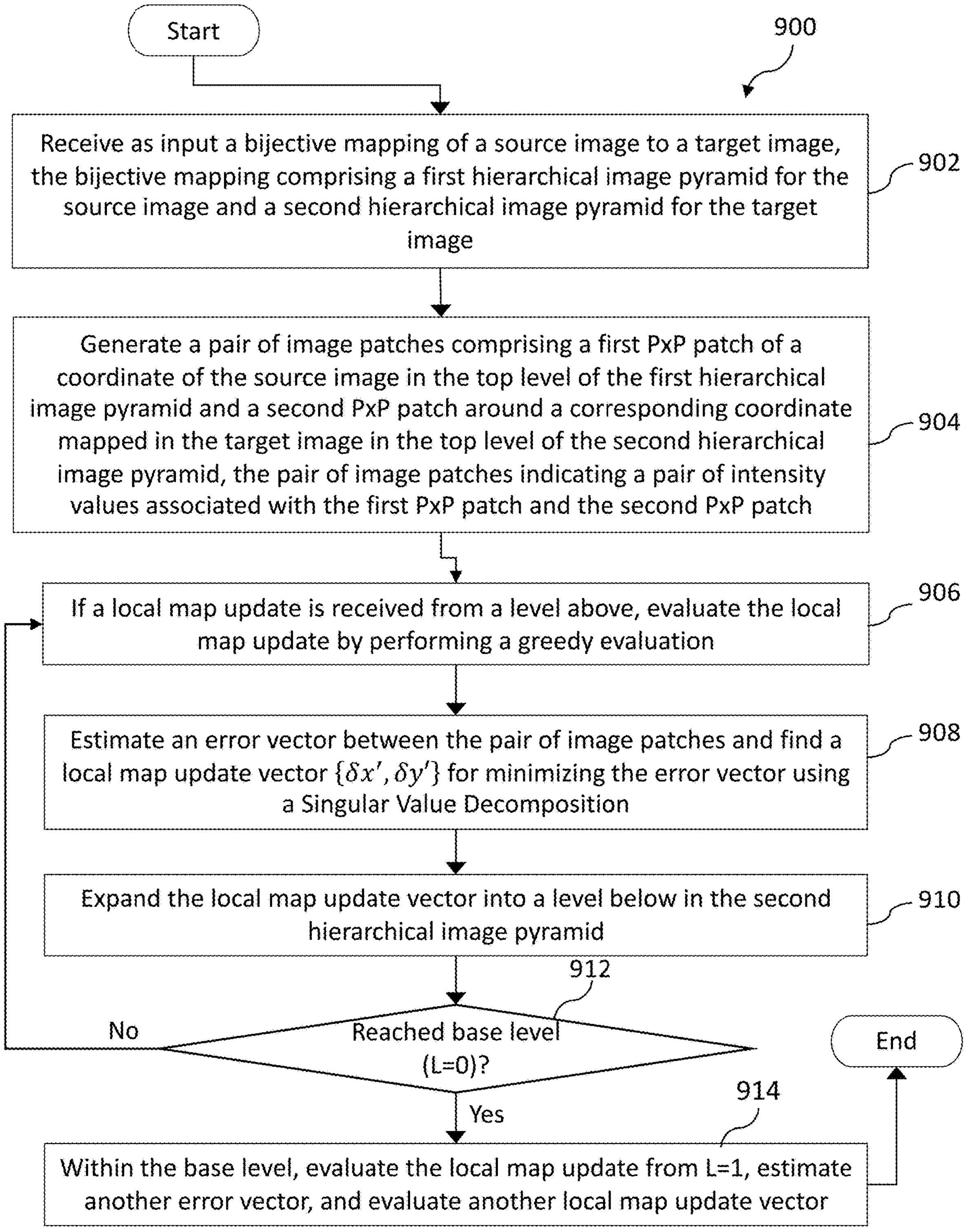
FIG. 9 is a process flow diagram illustrating an exemplary method for hierarchical map relaxation for an inside-out location tracking and mapping system, in accordance with one or more embodiments.

FIG. 9 is a process flow diagram illustrating an exemplary method for hierarchical map relaxation for an inside-out location tracking and mapping system, in accordance with one or more embodiments. Method 900 may begin with receiving as input a bijective mapping of a source image to a target image at step 902, the bijective mapping comprising a first hierarchical image pyramid for the source image and a second hierarchical image pyramid for the target image. In some examples, each of the first and the second hierarchical image pyramids may comprise a base level L=0 and N levels above the base level. In some examples, each level above the base level in each of the first and the second hierarchical image pyramids are downsampled by a predetermined factor from a level below. A pair of image patches may be generated at step 904, the pair of image patches comprising a first P×P patch of a coordinate of the source image in the top level of the first hierarchical image pyramid and a second P×P patch around a corresponding coordinate mapped in the target image in the top level of the second hierarchical image pyramid, wherein L=N at the top level of each of the first and the second hierarchical image pyramids, the pair of image patches indicating a pair of intensity values associated with the first P×P patch and the second P×P patch. If a local map update is received from a level above, the local map update may be evaluated at step 906 by performing a greedy evaluation. An error vector may be estimated between the pair of image patches at step 908, and a local map update vector {δx', δy'} for minimizing the error vector may be found using a Singular Value Decomposition. In some examples, estimating the error vector comprises taking a numerical derivative of an error vector with respect to the corresponding coordinate of the target image. In some examples, finding the local map update vector may comprise solving a linear system using a special case of Singular Value Decomposition, as described above. The local map update may be expanded into a level below in the second hierarchical image pyramids at step 910. A determination may be made at step 912 whether a base level has been reached. If not, the process iteratively repeats steps 906 through 910 to continue evaluating and estimating at each successive level, and expanding the local map update into the level below, until the base level is reached. When the base level—L=0—is reached, the local map update from L=1 may be evaluated, another error vector may be estimated to find another local map update vector, which may then be evaluated by another greedy evaluation at step 914.

In some examples, the method may also include outputting an image appearance match between the source image and the target image for use in downstream modules, for example, an optical flow translation estimator (e.g., optical flow translation estimator 112 in FIG. 1). In some examples, the image appearance match that is output may be configured to track non-rigid motion and parallax due to depth in a camera image stream. In some examples, the image appearance match may be provided to downstream mapping modules in tracking and mapping system for monitoring a group of users in a hazardous environment (e.g., a fire, a natural disaster afflicted area, other emergency situation). In other examples, the image appearance match is provided to a downstream mapping module in another type of system that uses camera data (e.g., autonomous navigation system, a medical imaging system, or a robotics system).

Optical Flow Translation Estimation

An optical flow translation estimation module (e.g., optical flow translation estimator 112 in FIG. 1) may be configured to estimate a translation component of camera motion using an arbitrary optical flow map. A method for optical flow translation estimation may begin with receiving as input a pair of camera images adjacent in time, as well as an initial estimate of an optical flow field and an initial estimate of camera motion (e.g., a rotation component of camera motion). In some examples, the initial estimate of the optical flow field may comprise output(s) from a hierarchical map relaxation module (e.g., after performing a map relaxation process on a hierarchical image pyramid provided by a homography fitting module, as described above). The optical flow translation estimation module may be configured to optimize a translation component of the camera motion. The method for optical flow translation estimation may link the camera motion estimate to the optical flow field estimate by including the camera motion estimate in a model of the optical flow field. A simple model for optical flow translation estimation may comprise the following homography:

$$H=R+tn^T/d$$

Figure 10A:
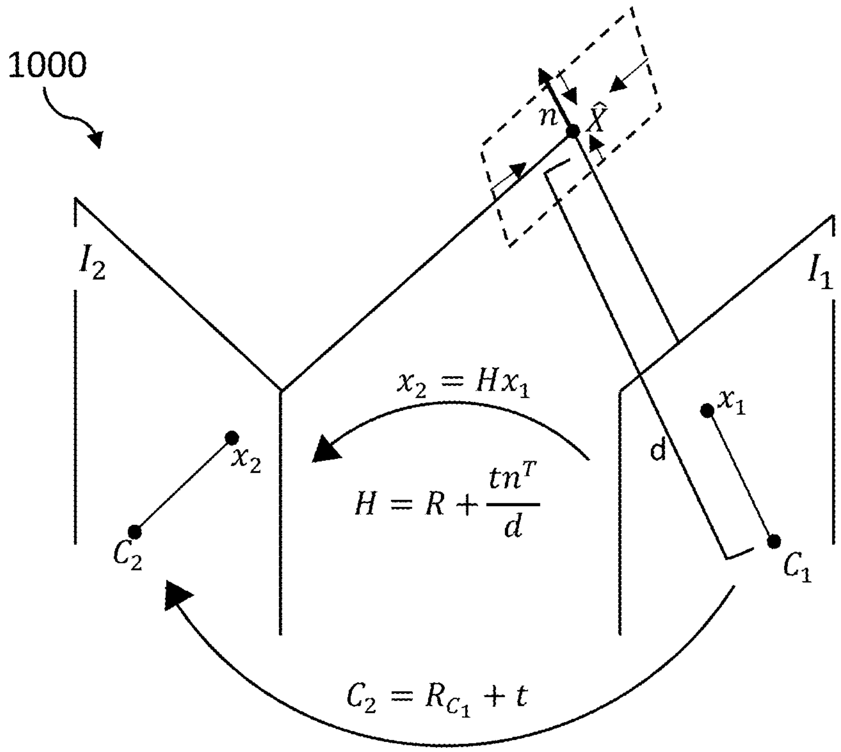
FIG. 10A is a diagram illustrating a prior art active transformation framework for a conventional scene structure estimation approach.

R=the camera motion rotation matrix
t=the camera motion translation vector
n=the homography plane normal
d=the distance from the initial camera to the homography plane FIG. 10A is a diagram illustrating an active transformation framework for a scene structure estimation approach. In diagram 1000, the scene is estimated as a set of 3D points, which means that for every 2D image point there is a proposed 3D world point $\hat{X}$. In conventional methods, triangulation methods are used to estimate a location of the 3D world point from camera centers $\{C_1, C_2\}$ and the 2D projections $\{x_1, x_2\}$ of the world point in camera frames $\{I_1, I_2\}$.

However, assuming that a point (e.g., 2D or 3D image point) is an infinitesimally small plane, the relationship between each matched pair of image points $\{x_1, x_2\}$ between camera frames may be modeled as a homography, $$H = R + \frac{tn^T}{d},$$

with a shared rotation R and translation t. Thus, for all pairs of matched image points $\{x_1, x_2\}$ the plane normal may be modeled as n=[0; 0; 1]{0, 0, 1}. Any inaccuracy introduced by fixing the per point pair plane normal may be absorbed in distance term d. By scaling these temporary distance variables any error between the assumed plane orientation and the true local orientation may be compensated for, since this orientation error only affects the distance between points in the image under 2D projection.

Figure 10B:
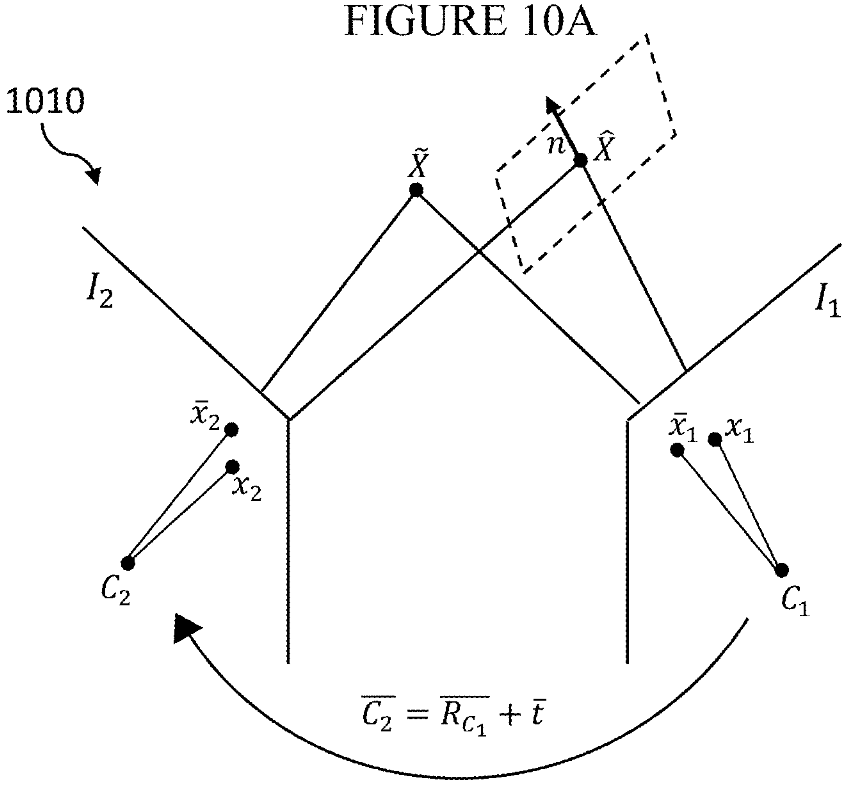
FIG. 10B is a diagram illustrating an exemplary active transformation framework for an optical flow translation estimator in an inside-out location tracking and mapping system, in accordance with one or more embodiments.

Still, there is uncertainty in the estimated locations of the pairs of image points $\{x_1, x_2\}$, which propagates into estimates of camera rotation and translation $\{\bar{R}, \bar{t}\}$ as well as the estimate of the world point location (i.e., location of a point in a given environment). A method for optical flow translation estimation may leverage prior knowledge about estimates of camera rotation and the Law of Large Numbers to counter the effects of this uncertainty. FIG. 10B is a diagram illustrating an exemplary active transformation framework for an optical flow translation estimator in an inside-out location tracking and mapping system, in accordance with one or more embodiments. Diagram 1010 shows the matched pair of image points $\{x_1, x_2\}$ as well as observed pair $\{\bar{x}_1, \bar{x}_2\}$. Uncertainty in estimates of the matched pair of image points $\{x_1, x_2\}$ may propagate into estimates of camera rotation and translation $\{\bar{R}, \bar{t}\}$ as well as an estimate of the world point location $\hat{X}$. In order to counter the uncertainty and estimate camera motion as close as possible to their true values {R, t}, prior knowledge of estimates of camera rotation and the Law of Large Numbers may be leveraged. The Law of Large Numbers tells us that the estimate of the translation vector from a large set of independent measurements should be close to its true value. Since we densely estimate the correspondences between all points in the source image and target image, $I_1$ and $I_2$, based on the Law of Large Numbers, the estimate of the translation vector from this large set of independent measurements should be close to its true value (e.g., true values {R, t}). Therefore, uncertainty in the estimate of any matched image point pair $\{\bar{x}_1, \bar{x}_2\}$ may be averaged out over the set of measurements when estimating the translation vector t. A parameter optimization process may be formulated as a statistical model and an average over the uncertainty in our matched image point pair estimates computed. The quantity to be averaged over is the error between observed matched image points $\{\bar{x}_1, \bar{x}_2\}$ and our model of them $\{\hat{x}_1, \hat{x}_2\}$, which may be defined as:

$$\hat{\epsilon} = \bar{x}_2 - \hat{x}_2 \|\bar{x}_2 - \hat{x}_2\|_2$$

The distance parameter optimization may use an $L_2$ norm of the errors and the translation optimization may use the raw errors.

The model of the translation vector may be varied in search of the smallest average error between all observed and modeled matched image pairs. In an example model, our prior knowledge of the camera rotation R may be conditioned to obtain P(t, n, d|R). This reduces rotation-induced translation ambiguity, occlusion of translation by rotation, and improves numerical stability by increasing independence between the remaining parameters being estimated. Homographies may be defined, for example, by decomposing the standard form $$H = R + \frac{tn^T}{d}$$

into the composition $H=H_2*H_1$, to derive an $H_2$ that represents the conditional probability distribution P(t, n, d|R) in the parameter estimation process. All vectors—t, n, $r_i$—may be 3×1 columns. A transpose operator, superscript T, maps these columns to a corresponding row. The components of a vector may be demarcated with subscripts with a semicolon indicating column stacking, and commas indicating row concatenation, such that $t \rightarrow [t_x; t_y; t_z]$. All homographies and rotations may be 3×3 matrices. With these notation preliminaries, the homographies may be defined as:

$H_1=R$ with R being the well-estimated camera rotation matrix $\bar{R}$ $$H_2 = I + \frac{1}{d} tn^T * R^T$$

with I being the 3×3 Identity Matrix and $R_T$ being the inverse of R

Assuming that n=[0; 0; 1], the homography may be simplified to:

$$H_2 = I + \frac{1}{d} t * [0, 0, 1] * R^T$$

$$H_2 = I + \frac{1}{d} * [t_x; t_y; t_z]^T * [0, 0, 1] * R^T$$

Defining the rows as $R=\{r_1, r_2, r_3\}$, the homography may be further simplified to:

$$H_2 = I + \frac{1}{d} * [t_x r_3; t_y r_3; t_z r_3]$$

$H_2$ represents the conditional probability distribution P(t, n, d|R) in the parameter estimation process. The dual optimization method for optical flow translation estimation will include comparing the transformation of $\bar{x}_1$ by $H=H_2*H_1$ followed by 2D projection to produce model image point $\hat{x}_2$ in target camera image $C_2$. Variations of this model point as d or t vary may be represented as $\tilde{x}_2$. When 2D image points are transformed using a homography, they may be augmented to be 2D homogeneous coordinates, e.g., $\bar{x}_1=\{\bar{x}_{1x}; \bar{x}_{1y}; 1\}$.

In order to more accurately model depth variations and estimate camera motion, an optical flow translation estimation method may include performing a dual optimization, which may comprise alternating between optimizing a distance parameter (e.g., depth estimation from optical flow) and a translation vector parameter (e.g., optical flow translation estimation) until convergence. Under an assumption that camera rotation $\bar{R}$ is well estimated and by modeling each world point $\hat{X}$ as an infinitesimally small plane, we can fix the plane normal associated with each point at n=[0; 0; 1], leaving only distance d and translation vector t to be optimized, with an ultimate goal of optimizing for an accurate estimate of translation vector t. In some examples, this dual optimization may be formulated in a passive framework, wherein points in the environment move relative to a single fixed camera, which enables the system to analyze the motion of the observed matched image points $\{\bar{x}_1, \bar{x}_2\}$ and the modeled image points, particularly $\hat{x}_2$, in a single image plane. The relationship between an active translation and passive translation may be modeled as a simple inverse active $[R|t] \rightarrow$ passive $[R^T|-R^T*t]$.

In some examples, a dual optimization method may alternate back and forth between optimizing the distance and translation vector parameters until convergence. The method may first optimize a distance parameter d by fixing other terms of the homography for all matched image point pairs. Using an updated distance parameter, all homography parameters except translation may then be fixed, and the translation vector optimized to reflect the updated distance parameter. Once an update to the translation vector is determined, the process iterates back to updating the distance parameter(s) and then the translation vector again, until convergence. Thereby homography $H_2$ enables the formulation of the dual optimization problem as minimizing the error between each modeled point in the target camera image $\hat{x}_2$ and the point according to the estimated optical flow $\bar{x}_2$, $\hat{e}_i=\hat{x}_{2i}-\bar{x}_{2i}$. Since this error can only be due to depth variation or inaccuracy in the translation vector estimate, reducing this error improves our parameter estimates, up to scale.

Figure 11:
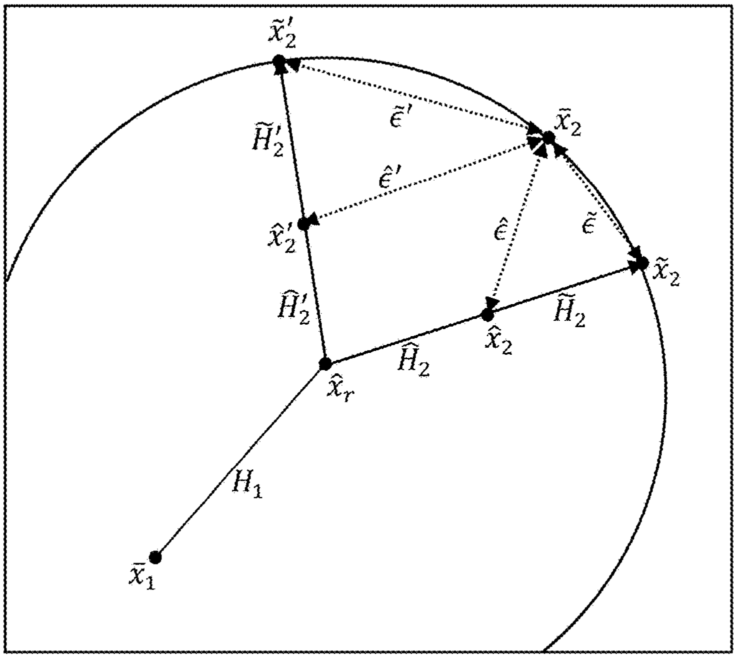
FIG. 11 is a geometric representation in a passive framework of a depth estimation process for an optical flow translation estimator in an inside-out location tracking and mapping system, in accordance with one or more embodiments.

When optimizing distance parameter d, the optimal equivalence is between the $L_2$ norm of the conditional optical flow $OF_r=\|\bar{x}_2-\hat{x}_r\|_2$ and the modeled conditional optical flow $\widehat{OF}_r=\|\hat{x}_2-\hat{x}_r\|_2$. If $OF_r=\widehat{OF}_r$, then, up to scale, a current distance parameter estimate is accurate. FIG. 11 is a geometric representation in a passive framework of a depth estimation process for an optical flow translation estimator in an inside-out location tracking and mapping system, in accordance with one or more embodiments. A rotation-only homography transform $H_1$ may comprise generating a homogeneous mapping of a source image point $\bar{x}_1$ into a frame of target camera $C_2$. Then by 2D projection, a point $\hat{x}_r$ (e.g., a projected point) may be produced in the target camera image $I_2$. A norm of this conditional optical flow may then be estimated $OF_r$, and the homography $H_2$, reflecting the current distance parameter d, may then be applied to a homogeneous mapping of $\bar{x}_1$ by $H_1$ followed by a 2D projection to produce point $\hat{x}_2$ (e.g., a modeled point) in the target camera image $I_2$. A norm of this modeled conditional optical flow model may then be estimated to generate $\widehat{OF}_r$. The distance parameter d may be updated to $d'=\alpha*d$, wherein $\alpha$ is equal to the ratio of conditional optical flow $L_2$ norms:

$$\alpha = \frac{\|\widehat{OF}_r\|_2}{\|OF_r\|_2}.$$

The updated distance parameter d' may then be used to produce an updated point in the target camera image $\tilde{x}_2$. An error between the updated point (e.g., distance update proposal) in the target camera image $\tilde{x}_2$ and the point in the estimated optical flow $\bar{x}_2$—$\tilde{\epsilon}=\|\bar{x}_2-\tilde{x}_2\|_2$—may then be compared to a corresponding error between the modeled point without the distance parameter update in the target camera image, $\hat{x}_2$, and the point in the estimated optical flow, $\bar{x}_2$—$\hat{\epsilon}=\|\bar{x}_2-\hat{x}_2\|_2$. If $\tilde{\epsilon}<\hat{\epsilon}$ then the new depth proposal d' is accepted. Otherwise, this distance update proposal may be rejected and the original d retained. Given the geometry shown in FIG. 11, an accepted distance update proposal may comprise $\{\hat{H}_2, \hat{x}_2, \tilde{H}_2, \tilde{x}_2, \hat{\epsilon}, \tilde{\epsilon}\}$ where $\langle \hat{H}_2, \tilde{H}_2 \rangle : \tilde{\epsilon}<\hat{\epsilon}$, and a rejected distance update proposal may comprise $\{\hat{H}'_2, \hat{x}'_2, \tilde{H}'_2, \tilde{x}'_2, \hat{\epsilon}', \tilde{\epsilon}'\}$ where $\langle \hat{H}'_2, \tilde{H}'_2 \rangle : \tilde{\epsilon}'<\hat{\epsilon}'$. At this point, the updated point in the target camera image $\tilde{x}_2$ lies on a circle centered at $\hat{x}_r$ with a radius of $\|OF_r\|_2$, but not all points on this circle have an error less than $\hat{\epsilon}$. The method then proceeds to estimating translation.

Figure 12:
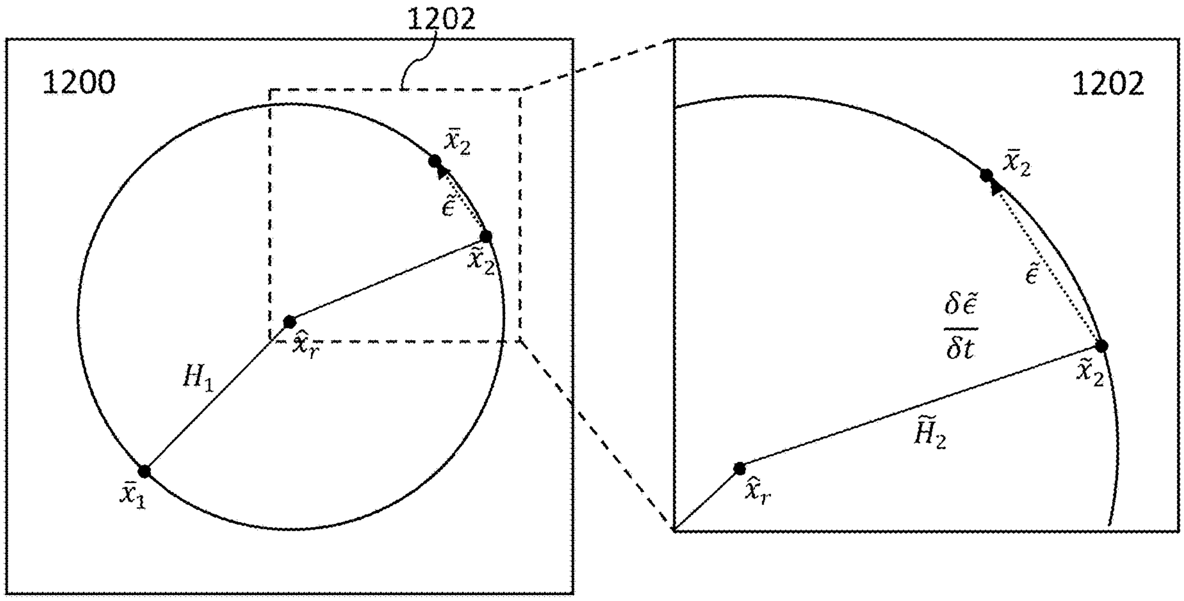
FIG. 12 is a geometric representation of a translation estimation process for an optical flow translation estimator in an inside-out location tracking and mapping system, in accordance with one or more embodiments.

Switching to the translation estimation process, the optimization of translation vector t may be formulated using a Maximum Likelihood Estimation. FIG. 12 is a geometric representation of a translation estimation process for an optical flow translation estimator in an inside-out location tracking and mapping system, in accordance with one or more embodiments. Diagram 1202 comprises a zoomed in call-out of the dotted line box in diagram 1200. Optimization of t may include estimating a partial derivative of the error $\hat{\epsilon}=\|\bar{x}_2-\hat{x}_2\|_2$ with respect to the 3 components of the translation vector $\{t_x; t_y; t_z\}$. A transformation between 2D homogeneous coordinates may first be determined as a function of homogeneous 2D points $x_i$, wherein subscript i indicates the camera frame, resulting in an $x_r$ to which a rotation-only homography has been applied to $x_1$. In some examples, all vectors may be column vectors. A transformation between 2D homogeneous coordinates may be represented as follows:

$$H_2 = I + \frac{1}{d} t r_3^T$$

$$x_2 = H_2 x_r$$

$$x_2 = \left(I + \frac{1}{d} t r_3^T\right) x_r$$

$$x_2 = (I + \frac{1}{d} t\left(r_3^T x_r\right)$$

Let:

$$\alpha = r_3^T x_r = r_{31} x_{r1} + r_{32} x_{r2} + r_{33} x_{r3}$$

so:

$$x_2 = x_r + \frac{1}{d}\alpha t$$

This exemplary transformation results in $$x_2 = x_r + \frac{1}{d}\alpha t.$$

Partial derivatives with respect to t and 2D projected points $p_i$ may be determined. For example, with respect to t:

$$\frac{\delta x_2}{\delta t_x} = \frac{1}{d}[1; 0; 0]\alpha = \frac{1}{d}[1; 0; 0](r_{31}x_{r1} + r_{32}x_{r2} + r_{33}x_{r3})$$

$$\frac{\delta x_2}{\delta t_y} = \frac{1}{d}[0; 1; 0]\alpha = \frac{1}{d}[0; 1; 0](r_{31}x_{r1} + r_{32}x_{r2} + r_{33}x_{r3})$$

$$\frac{\delta x_2}{\delta t_z} = \frac{1}{d}[0; 0; 1]\alpha = \frac{1}{d}[1; 0; 1](r_{31}x_{r1} + r_{32}x_{r2} + r_{33}x_{r3})$$

The 2D projected point $p_2$ may be defined as:

$$p_{2x} = \frac{x_{rx} + \frac{\alpha}{d} * t_x}{x_{rz} + \frac{\alpha}{d} * t_z}$$

$$p_{2y} = \frac{x_{ry} + \frac{\alpha}{d} * t_y}{x_{rz} + \frac{\alpha}{d} * t_z}$$

Then, using the quotient rule:

$$h(t) = \frac{f(t)}{g(t)};\ h'(t) - \frac{\delta}{\delta t}\left[\frac{f(t)}{g(t)}\right] = \frac{f'(t) * g(t) - f(t) * g'(t)}{g(t)^2}$$

Then, substituting in the homogeneous partial derivatives results in the following:

$$\frac{\delta p_{2x}}{\delta t_x} = \frac{\alpha}{d * \left(x_{rz} + \frac{\alpha}{d} * t_z\right)}$$

$$\frac{\delta p_{2x}}{\delta t_y} = 0$$

$$\frac{\delta p_{2x}}{\delta t_z} = -\frac{\alpha * \left(x_{rx} + \frac{\alpha}{d} * t_x\right)}{d * \left(x_{rz} + \frac{\alpha}{d} * t_z\right)^2}$$

$$\frac{\delta p_{2y}}{\delta t_x} = 0$$

$$\frac{\delta p_{2y}}{\delta t_y} = -\frac{\alpha}{d * \left(x_{rz} + \frac{\alpha}{d} * t_z\right)}$$

-continued $$\frac{\delta p_{2y}}{\delta t_z} = -\frac{\alpha * \left(x_{ry} + \frac{\alpha}{d} * t_y\right)}{d * \left(x_{rz} + \frac{\alpha}{d} * t_z\right)^2}$$

With these partial derivatives, the Jacobian is defined as:

$$\begin{bmatrix} \frac{\delta p_{2x}}{\delta t_x} & \frac{\delta p_{2y}}{\delta t_x} \\ \frac{\delta p_{2x}}{\delta t_y} & \frac{\delta p_{2y}}{\delta t_y} \\ \frac{\delta p_{2x}}{\delta t_z} & \frac{\delta p_{2y}}{\delta t_z} \end{bmatrix}$$

This allows for a definition of a regularized linear system Ax=b that can be solved using a robust linear system solver (e.g., Levenberg-Marquardt). The output of this optimization process is a new proposal for the translation vector t'=t+δt.

Figure 13A:
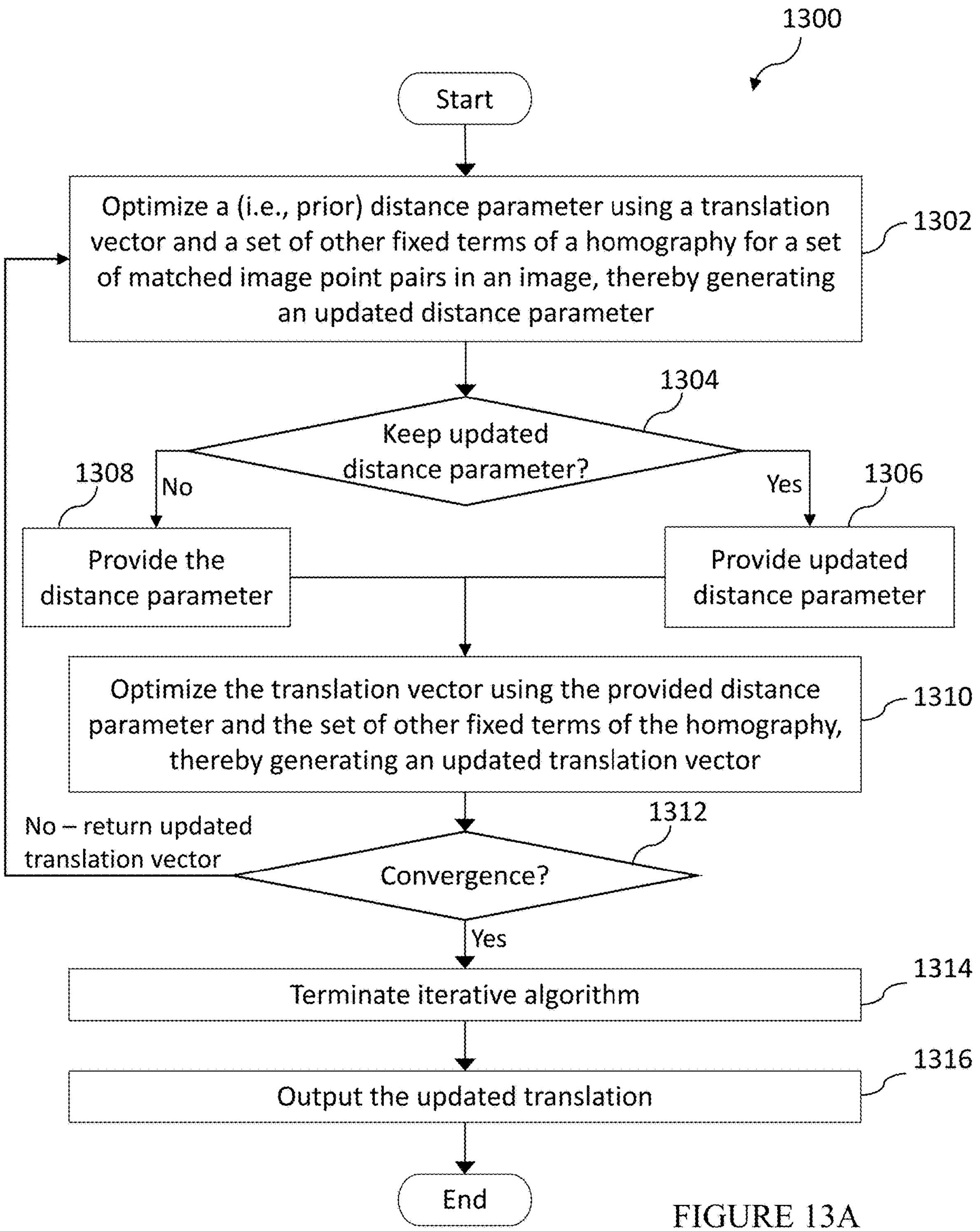
FIG. 13A is a process flow diagram illustrating an exemplary method for optical flow translation estimation for an inside-out location tracking and mapping system, in accordance with one or more embodiments.

FIG. 13A is a process flow diagram illustrating an exemplary method for optical flow translation estimation for an inside-out location tracking and mapping system, in accordance with one or more embodiments. Method 1300 may comprise a dual optimization process for optical flow translation estimation, beginning with optimizing a distance parameter, at step 1302, using a translation vector and a set of other fixed terms of a homography for a set of matched image point pairs in an image, thereby generating an updated distance parameter. In some examples, the translation vector may have resulted from an initial estimate of an optical flow output by an inter-frame hierarchical homography estimator, which may have been followed by a hierarchical map relaxation method, as described herein. In other examples, the translation vector may have been updated as described below and returned as part of an iterative process. In some examples, the distance parameter may comprise a prior distance parameter provided by an upstream module (e.g., a hierarchical map relaxation module, a Kalman filter, a hierarchical homography fitting module, etc.). In other examples, the distance parameter may comprise a prior distance parameter provided by a previous iteration of steps 1302-1312 of method 1300. At step 1304, a determination may be made whether to keep (i.e., retain) the updated distance parameter based on a comparison between the error between an updated point and an observed point and another error between an original modeled point and an observed point. If the first error is less than the second error, then the updated distance parameter is kept and provided at step 1306 for optimizing the translation vector. Otherwise, the updated distance parameter is rejected and the (i.e., previous, original) distance parameter is provided at step 1308 for optimizing the translation vector.

At step 1310, the translation vector is optimized using the provided distance parameter and the set of other fixed terms of the homography, thereby generating an updated translation vector. A convergence may be evaluated at step 1312. In some examples, convergence may comprise one, or a combination, of (a) a size of the parameter updates fall below a predetermined size threshold value, (b) an error reduction falls below a predetermined error reduction threshold, and (c) a number of iterations exceeds a maximum iterations threshold. In other examples, other conditions may be used to indicate convergence. If there is no convergence, the updated translation vector (e.g., along with the provided distance parameter) is returned to step 1302 for another iteration of the dual optimization method. If there is convergence, then the iterative algorithm is terminated at step 1314, and the updated translation vector is output at step 1316, for example, for downstream processing as described herein (e.g., by a map refinement module, a pose refinement module, further depth estimation, etc.).

Figure 13B:
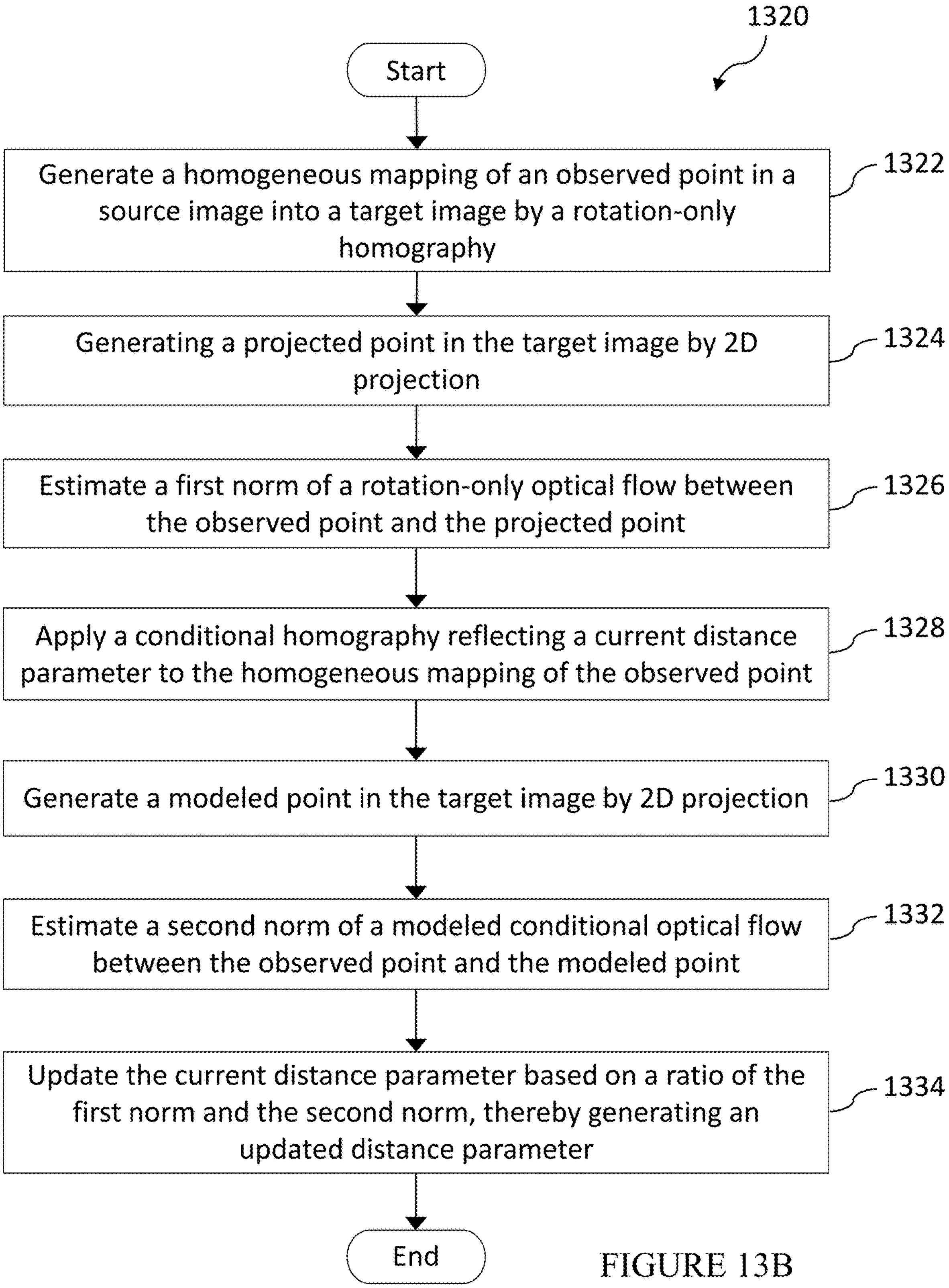
FIG. 13B is a process flow diagram illustrating an exemplary method for optimizing a distance parameter for optical flow translation estimation, in accordance with one or more embodiments.

FIG. 13B is a process flow diagram illustrating an exemplary method for optimizing a distance parameter for optical flow translation estimation, in accordance with one or more embodiments. Step 1302 in method 1300 above may comprise one or more of the following steps in method 1320. Method 1320 may begin with generating a homogeneous mapping of an observed point in a source image into a target image by a rotation-only homography at step 1322. A projected point in the target image may be generated by a 2D projection at step 1324. A first norm of a rotation-only optical flow between the observed point and the projected point may be estimated at step 1326. A conditional homography reflecting a current distance parameter may be applied to the homogenous mapping of the observed point at step 1328. A modeled point in the target image may be generated by a 2D projection at step 1330. A second norm of a modeled conditional optical flow between the observed point and the modeled point may be estimated at step 1332. The current distance parameter may be updated based on a ratio of the first norm and the second norm at step 1334, thereby generating an updated distance parameter. In some examples, the updated distance parameter may be used to generate an updated point to be used in step 1304 above (see method 1300 in FIG. 13A) for determining whether or not to keep the updated distance parameter.

Figure 13C:
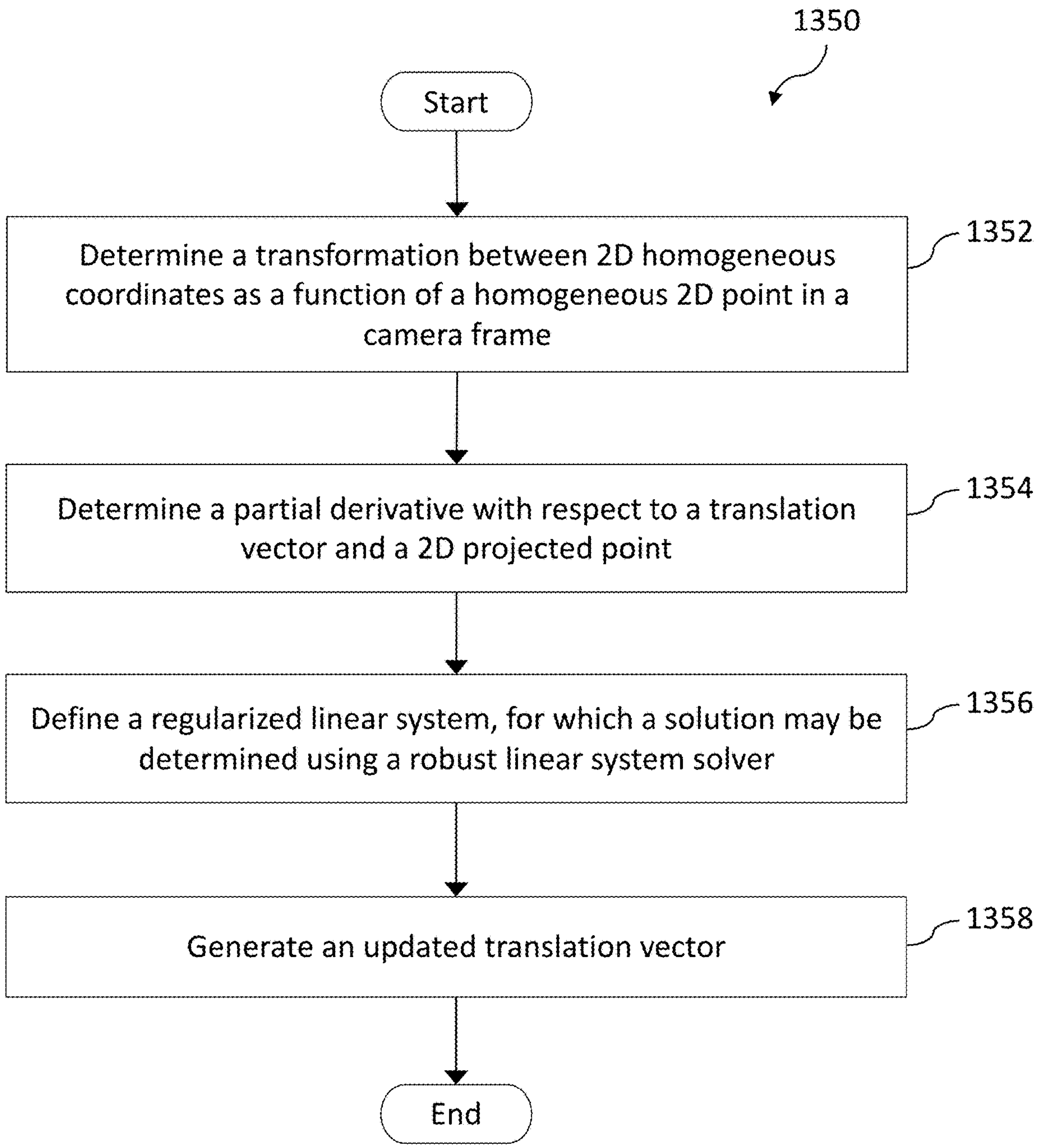
FIG. 13C is a process flow diagram illustrating an exemplary method for optimizing a translation vector for optical flow translation estimation, in accordance with one or more embodiments.

FIG. 13C is a process flow diagram illustrating an exemplary method for optimizing a translation vector for optical flow translation estimation, in accordance with one or more embodiments. Step 1310 in method 1300 above may comprise one or more of the following steps in method 1350. Method 1350 may begin with determining a transformation between 2D homogeneous coordinates as a function of a homogeneous 2D point in a camera frame at step 1352. A partial derivative with respect to a translation vector and a 2D projected point may be determined at step 1354. A regularized linear system may be determined using a Jacobian defined using the partial derivative at step 1356, for which a solution may be determined using a robust linear system solver (e.g., a Levenberg-Marquardt algorithm). An updated translation vector may be updated at step 1358. In some examples, the updated translation vector may be returned for another iteration of the dual optimization method described above (see method 1300 in FIG. 13A), for example if there is no convergence. In other examples, the updated translation vector may be output for downstream processing as described herein (e.g., by a map refinement module, a pose refinement module, further depth estimation, etc.).

Once the optical flow translation estimation is complete, the most recent inter-frame camera motion transformation (e.g., including the updated translation vector) may be refined by the pose refinement module, which may be configured to take the total camera track of each pixel into consideration and optimize the inter-frame motion to be most consistent with the complete history of estimated scene geometry.

Map Refinement

A map refinement module (e.g., map refinement module 118 in FIG. 1) may be part of a live-frame mapping system (e.g., live-frame mapping system 111 in FIG. 1), and may be configured to expand matching correspondences from inter-frame tracking to matching across arbitrarily long camera trajectories. More specifically, the map refinement module may be configured to refine tracking data (e.g., scene structure, camera motion estimates) to be consistent both geometrically and in appearance. The camera track of each pixel may be used to match pixel locations across arbitrarily long histories. In this way, the pixel tracking may account for parallax that becomes apparent over longer camera motions. For each new inter-frame camera motion:

- The image gradient estimated in the reference frame is compared against the image gradient at the initial estimate within the current frame;
- The initial estimate of the correspondence in the current frame is projected onto the epipolar line derived from the reference frame using perpendicular projection;
- The image gradient at this projected point is also compared to the image gradient at the reference frame coordinate
- Furthermore, the error gradient along the epipolar line is estimated to produce a hypothesis about a coordinate in the current frame that continues to minimize the error in image gradient;
- Of these 3 coordinate proposals in the current frame, the one with the lowest error that aligns with the reference image gradient is kept.

Figure 14:
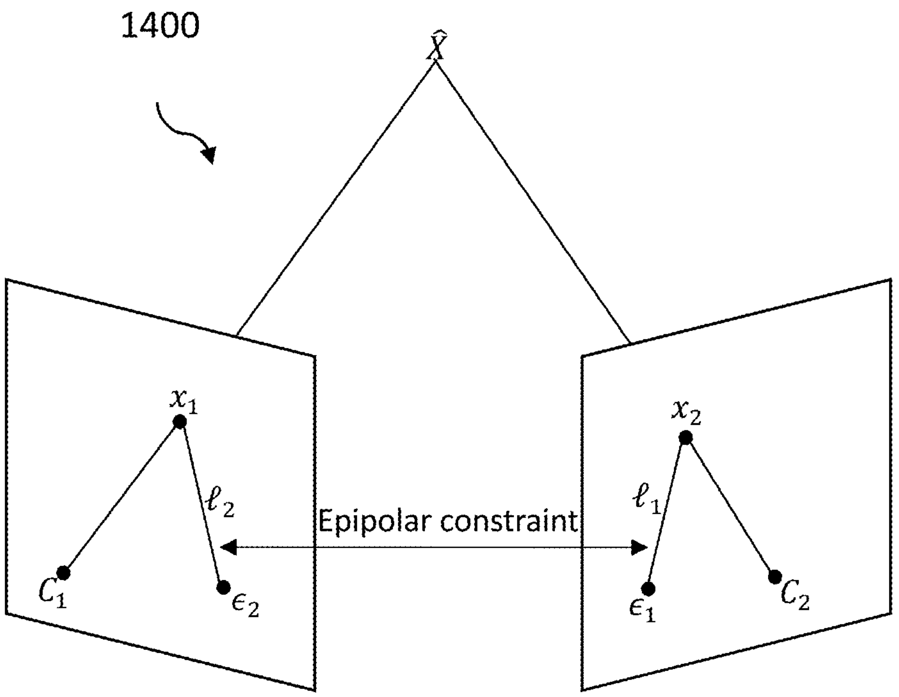
FIG. 14 is a diagram showing a triangulation constraint relative to a pair of image points and epipolar lines expressing geometric consistency between pairs of camera views of the same scene point, in accordance with one or more embodiments.

FIG. 14 is a diagram showing a triangulation constraint relative to a pair of image points and epipolar lines expressing geometric consistency between pairs of camera views of the same scene point, in accordance with one or more embodiments. In some examples, geometric consistency may mean all pairs of camera views of the same scene point intersecting at the same point in space (i.e., a triangulation constraint). In some examples, geometric consistency may mean for all pairs of camera views of the same scene point, a line may be drawn connecting each camera center and the scene point such that when the line through one camera center is projected into the imaging plane of the other, the projection of the scene point in this image plane lies upon the projected line (i.e., an epipolar constraint). Therefore, geometric consistency may be expressed in terms of a triangulation constraint upon the following triplets of camera locations and scene points $\{C_1, C_2, \hat{X}\}$, or as an epipolar constraint upon pairs of image points and epipolar lines: $\{x_1, \ell_2\}$ or $\{x_2, \ell_1\}$, as shown in diagram 1400. Together, these geometric constraints capture both the 3D Euclidean structure and 2D projective geometry.

In some examples, appearance inconsistency may comprise any difference in coordinate-wise intensity values, or a feature derived from image intensity values at a 2D image coordinate, under a coordinate transform. For example, for a stationary camera under the Identity transform, any non-zero appearance error represents noise in the camera. In another example, for a moving camera with the camera motion modeled as a planar warp transform, the appearance error represents both camera noise and error between the transformed model and the actual camera motion and/or scene structure.

Figure 15:
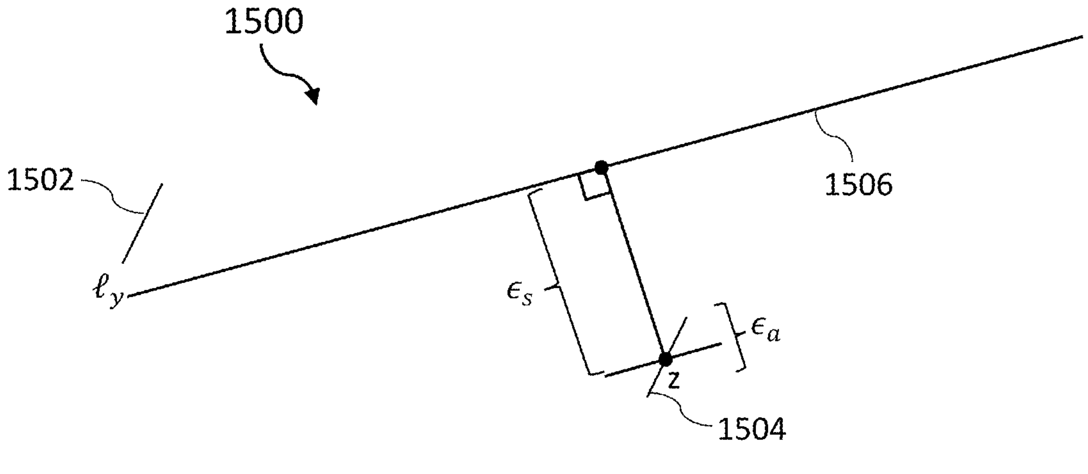
FIG. 15 is a diagram showing an epipolar line along which geometric and appearance errors for a single {z, y} pair are to be minimized, in accordance with one or more embodiments.

The methods described herein for refining a map (e.g., map tracking refinement) jointly optimizes geometric and appearance consistency. FIG. 15 is a diagram showing an epipolar line along which geometric and appearance errors for a single {z, y} pair are to be minimized, in accordance with one or more embodiments. A live frame comprises a most recent camera image. In a live frame, there may be a set of successfully tracked points Z. Each tracked point consists of its 2D coordinates z in the image, as well as an appearance feature $f_z$, and an estimated camera transform from the reference to the live frame for each {z, y} pair. Diagram 500 shows reference feature prediction y 1502 in a live frame and live frame feature z 1504, along with epipolar line of reference y 1506 (e.g., $\ell_y$) in the live scene, geometric error $\in_s$, and appearance error $\in_a$.

A constraint upon these derived appearance features is that they may be expressed as a vector and any error function applied to them is equal to zero when two features are equal and greater than 0 otherwise (e.g., the Euclidean $L_2$ norm and the absolute value of the angle between the feature vectors). While all z are in the live frame, the associated y and $f_y$ may be from a different reference frame, as may be tracked by a tracking grid class in an associative data structure, as described herein. The geometric error may be defined as a perpendicular distance between z and an epipolar line $\ell_y$ corresponding to a matched reference point y: $d_\perp(z, \ell_y)$. This transform from reference point y to epipolar line $\ell_y$ may be calculated using the Essential Matrix E derived from reference frame camera motion into the live frame as $E=[t_y]_x \cdot R_y$ where $t_y$ and $R_y$ comprise the translation and rotation, respectively, from the reference frame of y into the live frame. When the geometric error is zero, z falls on the epipolar line $\ell_y$. The hypotheses below propose δz that minimizes geometric error while being evaluated in terms of appearance error, thereby jointly minimizing these two errors.

Figure 16:
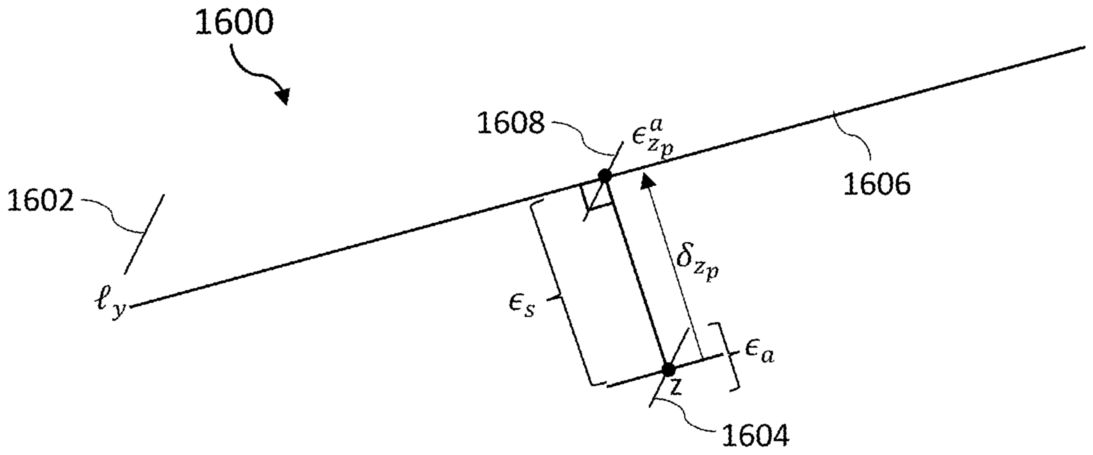
FIG. 16 is a diagram of a perpendicular projection hypothesis and evaluation, in accordance with one or more embodiments.
Figure 17:
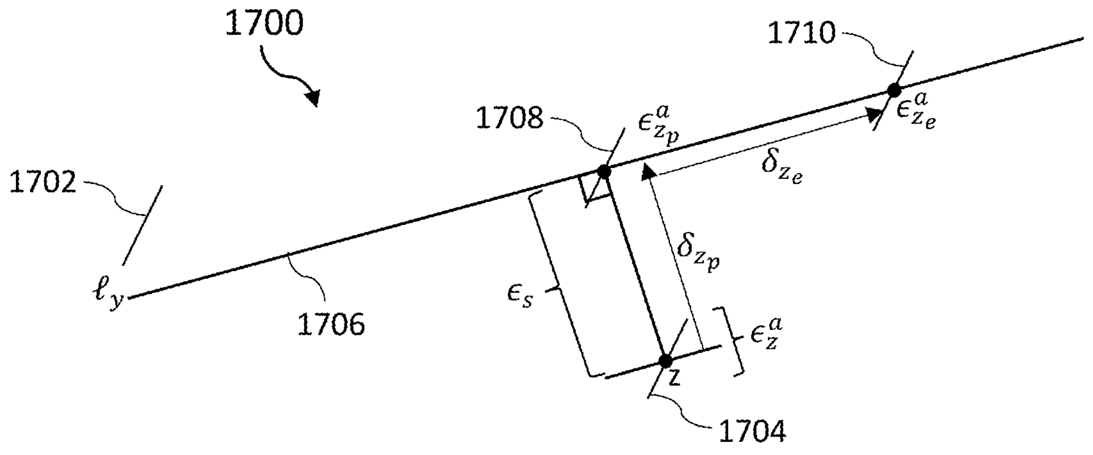
FIG. 17 is a diagram of a second location hypothesis and evaluation, in accordance with one or more embodiments.

Geometric and appearance errors may be decreased in a hypothesis-driven manner. FIG. 16 is a diagram of a perpendicular projection hypothesis and evaluation, in accordance with one or more embodiments. In diagram 1600, at z, the appearance error $$\epsilon_z^a$$

may be evaluated between the z and y features 1604 and 1602, $f_z$ and $f_y$, respectively. The perpendicular projection hypothesis may reduce the geometric error $$\epsilon_{z_p}^s$$

to zero using $\delta z_p$. After $z_p$ is estimated as $z_p=z+\delta z_p$, appearance error $$\epsilon_{z_p}^a$$

may be calculated between a feature 1608 (i.e., $f_{z_p}$) at $z_p$ and feature 1602 (i.e., $f_y$). FIG. 17 is a diagram of a second location hypothesis and evaluation, in accordance with one or more embodiments. In diagram 1700, since all points along the epipolar line 1706 are consistent with a currently estimated scene structure and camera motion from the reference frame to the live frame, said points can be assumed to have zero geometric error. Therefore, according to an epipolar line hypothesis, an additional location $z_e$ along the epipolar line 1706 (i.e., $\ell_y$) may be evaluated in terms of its appearance $f_{z_e}$ (i.e., feature 1710). Likewise, at $z_e$ the appearance error $$\epsilon_{z_e}^a$$

may be evaluated between the $z_e$ and y features 1710 and 1702 (i.e., $f_{z_e}$ and $f_y$), respectively. For example, after generating $z_p$ and $f_{z_p}$ (i.e., feature 1708) using perpendicular projection, $z_e$ and $f_{z_e}$ (i.e., feature 1710) may be generated by moving along epipolar line $\ell_y$ (i.e., line 1706). The direction and step size along epipolar line $\ell_y$ may be estimated by interrogating how the feature changes in the image about $z_p$ by using linear systems theory. A directional derivative along the epipolar line $\ell_y$ at $z_p$ may be taken (e.g., numerically) with respect to appearance error $$\epsilon_{z_p}^a.$$

A step recommendation $\delta z_e$ may be found by solving a linear system:

$$Ax = b;\ A = J^T J,\ b = J^T \epsilon;\ J = \frac{\delta \in_{z_p}^a}{dl_y};\ \delta z_e = (J^T J)^{-1} J^T \epsilon_{z_p}^a$$

The hypothesis $z_e$ may be assumed to have zero geometric error and may also reduce the appearance error relative to $z_p$.

A Greedy, Ordered Optimization may be adopted to evaluate the hypothesis $z_e$:

$$\text{If}(\epsilon_{z_e}^a < \epsilon_z^a)\ \&\ (\epsilon_{z_e}^a < \epsilon_{z_p}^a)\ \text{then}\ z = z_e$$
$$\text{else if}\ (\epsilon_{z_p}^a < \epsilon_z^a)\ \text{then}\ z = z_p$$
$$\text{else if}\ (\epsilon_z^a > maxErrorThreshold)\ \text{then}\ z = \text{reset}$$
$$\text{else retain}\ z = z$$

This algorithm operates from the epipolar line hypothesis (e.g., as shown in FIG. 17) back through the perpendicular projection hypothesis (e.g., as shown in FIG. 16), and then checking if the original appearance error $$\epsilon_z^a$$

exceeds a quality threshold (i.e., maxErrorThreshold), which may be predetermined and stored. If the appearance errors indicate insufficient appearance consistency with reference feature $f_y$, a reset of tracking at that location in the live frame may be triggered. This map refinement process may be run across all tracked locations in the live frame, thereby ensuring improvement in tracking quality (e.g., geometric and appearance consistency) and censoring of bad tracking instances.

Figure 18:
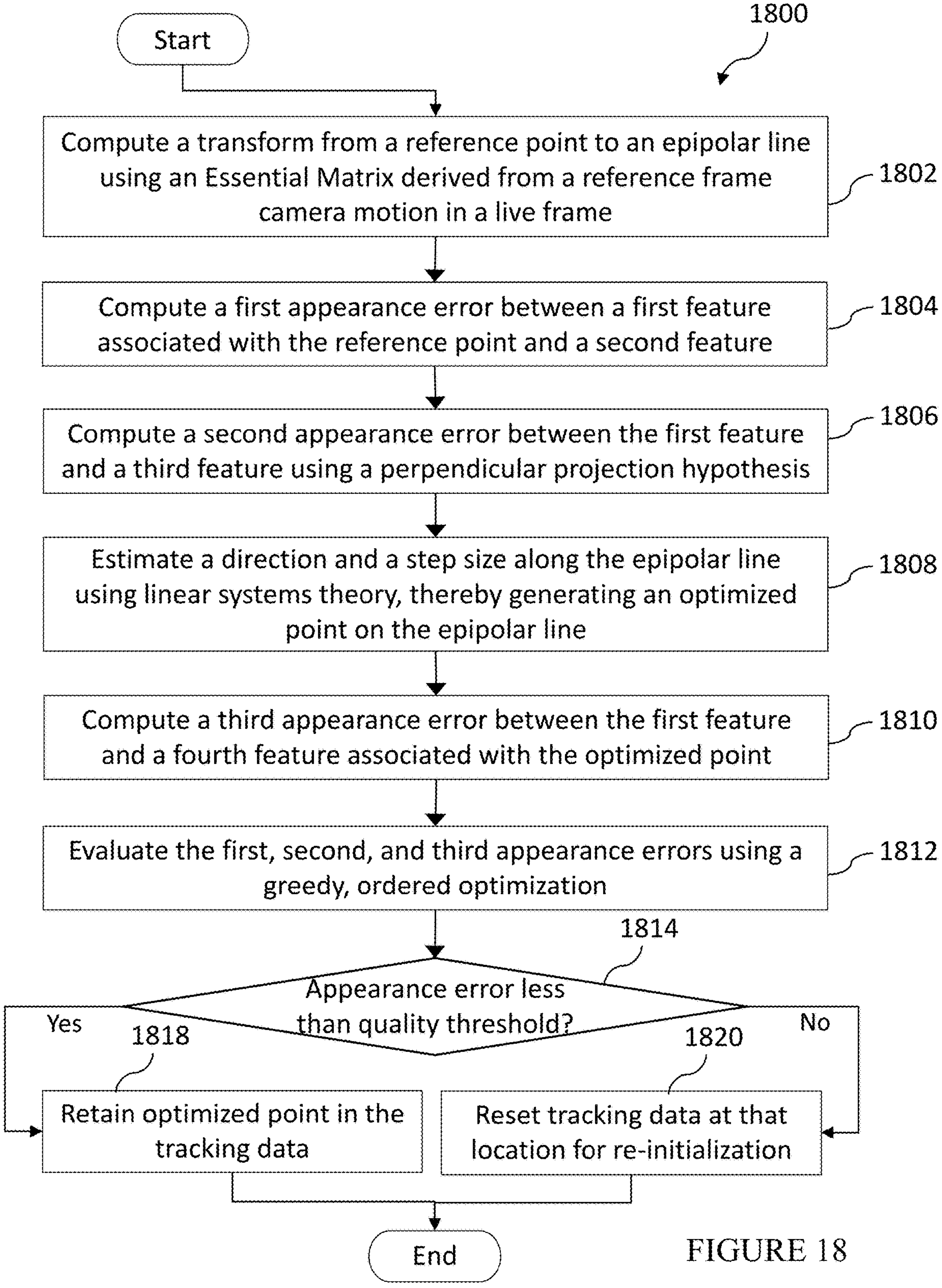
FIG. 18 is a process flow diagram illustrating an exemplary method for map refinement for an inside-out location tracking and mapping system, in accordance with one or more embodiments.

FIG. 18 is a process flow diagram illustrating an exemplary method for map refinement for an inside-out location tracking and mapping system, in accordance with one or more embodiments. Method 1800 may begin with computing a transform from a reference point to an epipolar line, at step 1802, using an Essential Matrix derived from a reference frame camera motion in a live frame. A first appearance error may be computed between a first feature associated with the reference point and a second feature, at step 1804. A second appearance error may be computed between the first feature and a third feature, using a perpendicular projection hypothesis, at step 1806. A direction and a step size along the epipolar line may be estimated, at step 1808, using linear system theory, thereby generating an optimized point on the epipolar line. A third appearance error may be computed between the first feature and a fourth feature associated with the optimized point at step 1810. The first, second, and third appearance errors may be evaluated using a greedy, ordered optimization at step 1812. The appearance error may then be compared against a predetermined quality threshold at step 1814. If the appearance error is less than the predetermined quality threshold, then the optimized point is retained in tracking data at step 1816. Otherwise, the tracking data is reset at a location associated with the reference point for reinitialization at step 1818. In other examples, the predetermined quality threshold may be set such that the optimized point is retained when equal to or less than the predetermined quality threshold. In some examples, an updated map and associated map data may be output, including any updated optimized points and any other updated tracking data for the live frame. This output may be provided to a client device, a sparse mapping backend, and/or returned to a visual inertial odometry system (e.g., as shown in FIG. 1).

In some examples, the outputs of any of the systems and subsystems in described herein (e.g., updated map and associated map data, image appearance matches, updated translations, updated state postdiction, other estimates and updates) may be provided to a downstream mapping module in a tracking and mapping system (e.g., for tracking a group of users in a hazardous environment, tracking a team of users in a tactical operation, etc.) or other systems (e.g., autonomous navigation system, medical imaging system, robotics system).

Figure 19A:
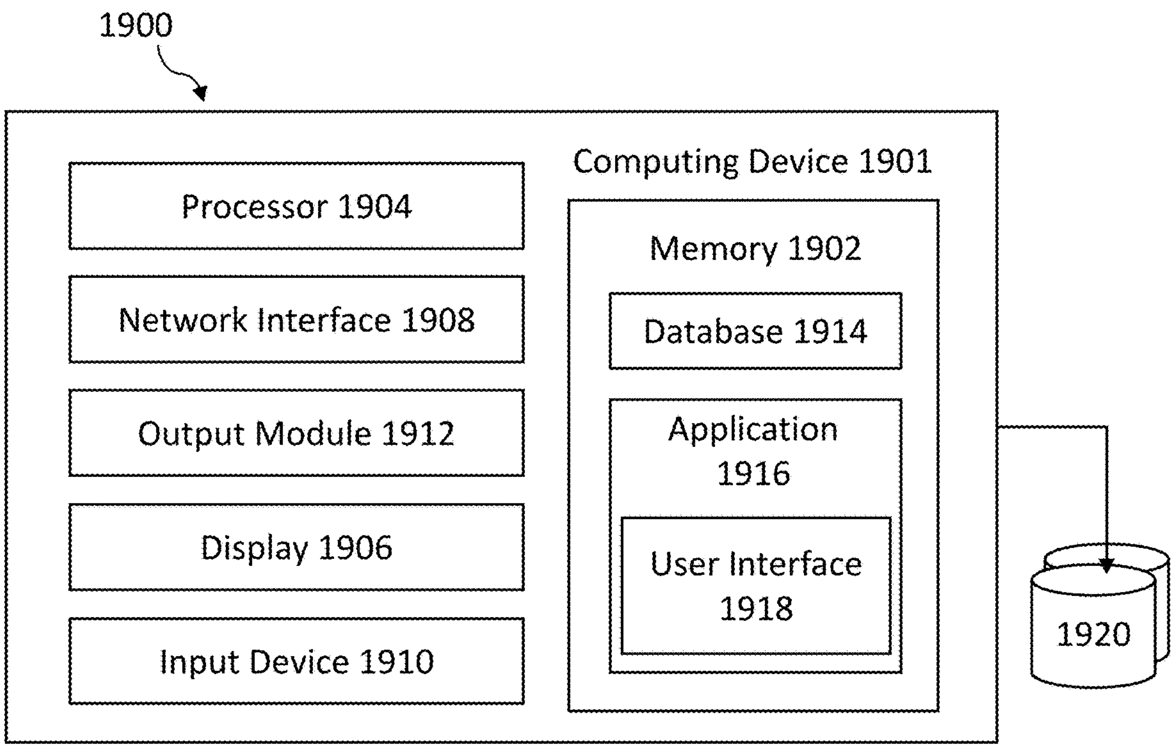
FIG. 19A is a simplified block diagram of an exemplary computing system configured to perform steps of the methods illustrated herein and implement the systems shown herein, in accordance with one or more embodiments.

FIG. 19A is a simplified block diagram of an exemplary computing system configured to perform steps of the methods illustrated herein and implement the systems shown herein, in accordance with one or more embodiments. In one embodiment, computing system 1900 may include computing device 1901 and storage system 1920. Storage system 1920 may comprise a plurality of repositories and/or other forms of data storage, and it also may be in communication with computing device 1901. In another embodiment, storage system 1920, which may comprise a plurality of repositories, may be housed in one or more of computing device 1901. In some examples, storage system 520 may store sensor data (e.g., camera data, IMU data), telemetry data, other image data, map data, networks, instructions, programs, and other various types of information as described herein (e.g., in a tracking grid or other associative data structure). This information may be retrieved or otherwise accessed by one or more computing devices, such as computing device 1901, in order to perform some or all of the features described herein. Storage system 1920 may comprise any type of computer storage, such as a hard drive, memory card, ROM, RAM, DVD, CD-ROM, write-capable, and read-only memories. In addition, storage system 1920 may include a distributed storage system where data is stored on a plurality of different storage devices, which may be physically located at the same or different geographic locations (e.g., in a distributed computing system such as system 1950 in FIG. 19B). Storage system 1920 may be networked to computing device 1901 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 1901, which in some examples may be included in one or more components of an inside-out location tracking and mapping system (e.g., system 100 in FIG. 1), also may include a memory 1902. Memory 1902 may comprise a storage system configured to store a database 1914 and an application 1916. Application 1916 may include instructions which, when executed by a processor 1904, cause computing device 1901 to perform various steps and/or functions (e.g., hierarchical map relaxation, optical flow translation estimation, map tracking refinement, etc.), as described herein. Application 1916 further includes instructions for generating a user interface 1918. Database 1914 may store various algorithms and/or data, including neural networks, sensor data, telemetry data, and other mapping and tracking data. Memory 1902 may include any non-transitory computer-readable storage medium for storing data and/or software that is executable by processor 1904, and/or any other medium which may be used to store information that may be accessed by processor 1904 to control the operation of computing device 1901.

Computing device 1901 may further include a display 506, a network interface 1908, an input device 1910, and/or an output module 1912. Display 1906 may be any display device by means of which computing device 1901 may output and/or display data. Network interface 1908 may be configured to connect to a network using any of the wired and wireless short range communication protocols described above, as well as a cellular data network, a satellite network, free space optical network and/or the Internet. Input device 1910 may comprise buttons, a mouse, keyboard, touch screen, voice interface, and/or any or other hand-held controller or device or interface by means of which a user may interact with computing device 1901. Output module 1912 may be a bus, port, and/or other interfaces by means of which computing device 501 may connect to and/or output data to other devices and/or peripherals.

In one embodiment, computing device 1901 is a data center or other control facility (e.g., configured to run a distributed computing system as described herein), and may communicate with a wireless beacon locator, navigation and communications system, command and control device, and other systems and devices described herein. As described herein, system 1900, and particularly computing device 1901, may be used for estimating error vectors, optimizing distance parameters, optimizing translation vectors, computing transforms, evaluating errors, and otherwise implementing steps for hierarchical map relaxation, optical flow translation estimation, and map tracking refinement, as described herein. Various configurations of system 1900 are envisioned, and various steps and/or functions of the processes described below may be shared among the various devices of system 1900 or may be assigned to specific devices.

Figure 19B:
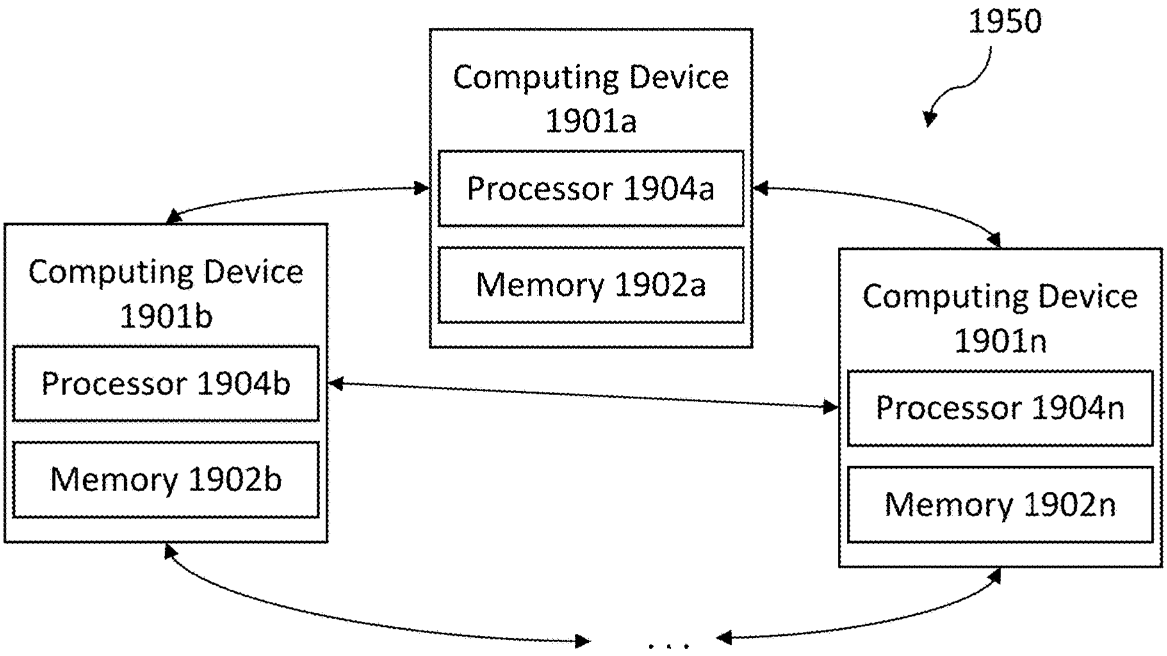
FIG. 19B is a simplified block diagram of an exemplary distributed computing system implemented by a plurality of the computing devices in FIG. 19A, in accordance with one or more embodiments.

FIG. 19B is a simplified block diagram of an exemplary distributed computing system implemented by a plurality of the computing devices in FIG. 19A, in accordance with one or more embodiments. System 1950 may comprise two or more computing devices 1901*a-n*. In some examples, each of 1901*a-n* may comprise one or more of processors 1904*a-n*, respectively, and one or more of memory 1902*a-n*, respectively. Processors 1904*a-n* may function similarly to processor 1904 in FIG. 19A, as described above. Memory 1902*a-n* may function similarly to memory 1902 in FIG. 19A, as described above.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a graphical processing unit (GPU), a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for map refinement by an inside-out location tracking system, the method comprising:

receiving, by the tracking system, IMU data and camera data from a client device comprising two or more sensors, the client device being carried or worn by a field user, the camera data comprising a live frame;

computing a transform from a reference point to an epipolar line using an Essential Matrix derived from a reference frame camera motion in the live frame;

computing a first appearance error between a first feature associated with the reference point and a second feature;

computing a second appearance error between the first feature and a third feature using a perpendicular projection hypothesis;

estimating a direction and a step size along the epipolar line using linear systems theory, thereby generating an optimized point on the epipolar line;

computing a third appearance error between the first feature and a fourth feature associated with the optimized point;

evaluating the first, second, and third appearance errors using a greedy, ordered optimization;

if the appearance error is less than a predetermined quality threshold, retaining the optimized point in tracking data, otherwise resetting the tracking data at a location associated with the reference point for reinitialization; and outputting an updated map and associated map data to the client device, one or both of the updated map and associated map data including one or more updated optimized points.

2. The method in claim 1, wherein the perpendicular projection hypothesis is configured to reduce a geometric error to zero.

3. The method of claim 1, further comprising taking a directional derivative along the epipolar line.

4. The method of claim 1, further comprising solving a linear system.

5. The method in claim 1, wherein the updated map and associated map data reflects tracking data that has been optimized for both geometric consistency and appearance consistency.

6. The method of claim 1, further comprising providing the updated map and associated map data to a sparse mapping backend.

7. The method of claim 1, wherein the client device is associated with an autonomous navigation system.

8. The method of claim 1, wherein the client device is associated with a medical imaging system.

9. The method of claim 1, wherein the client device is associated with a robotics system.

10. The method of claim 1, wherein the client device is associated with a tracking and mapping system for a group of emergency responders.

11. A system for map refinement for inside-out location tracking, the system comprising:

a memory comprising non-transitory computer-readable storage medium configured to store instructions and data, the data being stored in an associative data structure; and a processor communicatively coupled to the memory, the processor configured to execute instructions stored on the non-transitory computer-readable storage medium to:

receive, by the tracking system, IMU data and camera data from a client device comprising two or more sensors, the client device being carried or worn by a field user, the camera data comprising a live frame;

compute a transform from a reference point to an epipolar line using an Essential Matrix derived from a reference frame camera motion in the live frame, compute a first appearance error between a first feature associated with the reference point and a second feature;

compute a second appearance error between the first feature and a third feature using a perpendicular projection hypothesis;

estimate a direction and a step size along the epipolar line using linear systems theory, thereby generating an optimized point on the epipolar line;

compute a third appearance error between the first feature and a fourth feature associated with the optimized point;

evaluate the first, second, and third appearance errors using a greedy, ordered optimization; and if the appearance error is less than a predetermined quality threshold, retain the optimized point in tracking data, otherwise reset the tracking data at a location associated with the reference point for reinitialization; and output an updated map and associated map data to the client device, one or both of the updated map and associated map data including one or more updated optimized points.

12. The system of claim 11, wherein the associative data structure comprises a tracking grid configured to update information about camera and scene points.

13. The system of claim 11, wherein the associative data structure comprises a tracking grid configured to eliminate and insert new cameras and scene points.

14. The system of claim 11, wherein the associative data structure comprises a tracking grid configured to evaluate a quality of a tracked scene point.

15. The system in claim 11, wherein the data is associated with the reference frame camera motion in the live frame.

16. The system of claim 11, wherein the data comprises tracking data associated with the live frame.

17. The system of claim 11, wherein the data is associated with predetermined thresholds.

* * * * *